US010211995B2

(12) United States Patent
Wang et al.

(10) Patent No.: US 10,211,995 B2
(45) Date of Patent: Feb. 19, 2019

(54) BACKGROUND TRAFFIC DOWNLOADING METHOD, DEVICE, AND SYSTEM

(71) Applicant: Huawei Technologies Co., Ltd., Shenzhen (CN)

(72) Inventors: Shuo Wang, Shanghai (CN); Jingwang Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 15/482,532

(22) Filed: Apr. 7, 2017

(65) Prior Publication Data

US 2017/0214536 A1    Jul. 27, 2017

Related U.S. Application Data

(63) Continuation of application No. PCT/CN2014/088156, filed on Oct. 8, 2014.

(51) Int. Cl.
*H04L 12/14* (2006.01)
*H04L 12/28* (2006.01)
(Continued)

(52) U.S. Cl.
CPC ...... *H04L 12/1407* (2013.01); *H04L 12/1457* (2013.01); *H04L 47/27* (2013.01);
(Continued)

(58) Field of Classification Search
CPC ..... H04L 12/1407; H04L 12/28; H04M 15/66
See application file for complete search history.

(56) References Cited

U.S. PATENT DOCUMENTS 7,607,164 B2 * 10/2009 Vasishth ............... G06F 21/577
                                                   709/223
2012/0042076 A1 * 2/2012 Kawa .................... G06F 9/50
                                                   709/226
(Continued)

FOREIGN PATENT DOCUMENTS

CN    101119211 A    2/2008
CN    101345633 A    1/2009
(Continued)

*Primary Examiner* — Faruk Hamza
*Assistant Examiner* — Abusayeed M Haque
(74) *Attorney, Agent, or Firm* — Leydig, Voit & Mayer, Ltd.

(57) ABSTRACT

The present invention discloses a method, device and system for background traffic downloading, and relates to the communications field. A background traffic downloading policy is formulated for a user group, to resolve a problem of relatively high network overheads due to repeated responses of a policy and charging rules function unit. The background traffic downloading method includes: receiving, by a network awareness and schedule device, a background traffic downloading request sent by an application server; generating a background traffic downloading policy of a user group and an identifier of the background traffic downloading policy; sending the identifier to the application server; and receiving the identifier from a policy and charging rules function device, determining the background traffic downloading policy of the user group according to the identifier, and sending the background traffic downloading policy to the policy and charging rules function device.

11 Claims, 9 Drawing Sheets

(51) Int. Cl.
  *H04M 15/00* (2006.01)
  *H04L 29/06* (2006.01)
  *H04W 4/24* (2018.01)
  *H04L 12/807* (2013.01)

(52) U.S. Cl.
  CPC ........ *H04L 65/1063* (2013.01); *H04M 15/66* (2013.01); *H04W 4/24* (2013.01)

(56) References Cited

U.S. PATENT DOCUMENTS

| | | | |
|---|---|---|---|
| 2012/0109800 A1 | 5/2012 | Zhou et al. | |
| 2012/0149382 A1* | 6/2012 | Fox | H04W 36/245 |
| | | | 455/445 |
| 2015/0092610 A1* | 4/2015 | Russell | H04M 15/66 |
| | | | 370/259 |

FOREIGN PATENT DOCUMENTS

| | | |
|---|---|---|
| CN | 101945368 A | 1/2011 |
| CN | 102014343 A | 4/2011 |
| EP | 1708434 A1 | 10/2006 |

\* cited by examiner

BACKGROUND TRAFFIC DOWNLOADING METHOD, DEVICE, AND SYSTEM

CROSS-REFERENCE TO RELATED APPLICATIONS

This application is a continuation of International Application No. PCT/CN2014/088156, filed on Oct. 8, 2014, the disclosure of which is hereby incorporated by reference in its entirety.

TECHNICAL FIELD

The present invention relates to the communications field, and in particular, to a method, device and system for background traffic downloading.

BACKGROUND

Development and prosperity of a telecommunication market bring gradual expansion and maturity of a basic telecommunication service market. Many users in a government, an enterprise, or the like are connected to an operator network by using a third-party application server and perform user group communication by using a public network. A user group described herein includes all or some user terminals in industry users served by the third-party application server.

In the prior art, when a user group served by a third-party application server needs to download background traffic, for example, to upgrade a terminal application or update a terminal database, each user terminal in the user group sends a background traffic downloading request to the third-party application server. Then, the third-party application server forwards the background traffic downloading request to a PCRF (policy and charging rules function) unit on an operator network. The PCRF formulates a background traffic downloading policy for each user terminal in the user group, and formulates, according to the background traffic downloading policy of each user terminal, a specific network transmission policy that can satisfy the background traffic downloading request of the user group, that is, formulates policy control and charging control in background traffic downloading performed by each user terminal.

However, user terminals in a group may need to download same background traffic. According to the method in the prior art, a PCRF needs to repeatedly respond to all same background traffic downloading requests forwarded by a third-party application server. This brings unnecessary network overheads.

SUMMARY

Embodiments of the present invention provide a background traffic downloading method, a device, and a system, to resolve a problem that network overheads are relatively high because a policy and charging rules function unit repeatedly responds to background traffic downloading of a same user group.

To achieve the foregoing objective, the technical solutions used in the embodiments of the present invention are as follows:

According to a first aspect, a background traffic downloading method is provided, where the method includes:

receiving, by a network awareness and schedule device, a background traffic downloading request message sent by an application server, where the background traffic downloading request message carries requirement information required by a user group to download background traffic;

generating, by the network awareness and schedule device, a background traffic downloading policy of the user group and an identifier of the background traffic downloading policy according to the requirement information;

sending, by the network awareness and schedule device, the identifier of the background traffic downloading policy to the application server; and receiving, by the network awareness and schedule device, the identifier that is of the background traffic downloading policy and that is sent by a policy and charging rules function device, determining the background traffic downloading policy of the user group according to the identifier of the background traffic downloading policy, and sending the background traffic downloading policy to the policy and charging rules function device, so that the policy and charging rules function device determines policy and charging control in background traffic downloading according to the background traffic downloading policy.

With reference to the first aspect, in a first possible implementation manner of the first aspect, the requirement information includes at least one of the following information: an amount of traffic required by the user group to download background traffic, a time window required by the user group to download background traffic, or area information of the user group.

With reference to the first aspect or the first possible implementation manner of the first aspect, in a second possible implementation manner of the first aspect, the background traffic downloading policy includes at least one of the following information:

a permitted download time window, charging information of a single user terminal, a maximum download rate of a single user terminal, a maximum value of an aggregate download rate of the user group, or a charging policy in cases of different aggregate download rates.

With reference to the second possible implementation manner of the first aspect, in a third possible implementation manner of the first aspect, if the requirement information includes the time window required by the user group to download background traffic, the background traffic downloading policy includes the permitted download time window, where the time window required by the user group to download background traffic includes the permitted download time window; or if the requirement information includes the amount of traffic required by the user group to download background traffic, the background traffic downloading policy includes the maximum value of the aggregate download rate of the user group or the maximum download rate of the single user terminal in the user group, where the maximum value of the aggregate download rate of the user group or the maximum download rate of the single user terminal in the user group is determined according to the amount of traffic required by the user group to download background traffic.

With reference to the first aspect or the first possible implementation manner of the first aspect, in a fourth possible implementation manner of the first aspect, if the requirement information includes the time window required by the user group to download background traffic, before the generating, by the network awareness and schedule device, a background traffic downloading policy of the user group and an identifier of the background traffic downloading policy according to the requirement information, the method further includes:

determining, by the network awareness and schedule device, that a network can satisfy, within the time window required by the user group to download background traffic, the background traffic downloading request from the application server.

According to a second aspect, a background traffic downloading method is disclosed, where the method includes:

receiving, by a policy and charging rules function device, a background traffic download enabling request sent by an application server, where the background traffic download enabling request carries an identifier of a background traffic downloading policy of a user group;

sending, by the policy and charging rules function device, the identifier of the background traffic downloading policy to a network awareness and schedule device;

receiving, by the policy and charging rules function device, the background traffic downloading policy that is of the user group and that is returned by the network awareness and schedule device; and determining, by the policy and charging rules function device, policy and charging control in background traffic downloading according to the background traffic downloading policy.

With reference to the second aspect, in a first possible implementation manner of the second aspect, if the background traffic download enabling request further includes an IP address of each user terminal that is in the user group and that needs to download background traffic, the determining, by the policy and charging rules function device, policy and charging control in background traffic downloading according to the background traffic downloading policy includes:

determining, by the policy and charging rules function device according to the background traffic downloading policy and the IP address of each user terminal that is in the user group and that needs to download background traffic, a dedicated-bearer establishment moment and a maximum download rate for each user terminal that is in the user group and that needs to download background traffic.

With reference to the second aspect or the first possible implementation manner of the second aspect, in a second possible implementation manner of the second aspect, the method further includes:

sending, by the policy and charging rules function device, the policy and charging control to a policy and charging enforcement function device, so that the policy and charging enforcement function device allocates, according to the policy and charging control, a bearer resource for the background traffic downloading.

According to a third aspect, a background traffic downloading method is disclosed, where the method includes:

sending, by an application server, a background traffic downloading request message to a network awareness and schedule device, where the background traffic downloading request message carries requirement information required by a user group to download background traffic;

receiving, by the application server, an identifier that is of a background traffic downloading policy of the user group and that is sent by the network awareness and schedule device; and sending, by the application server, a background traffic download enabling request to a policy and charging rules function device, where the background traffic download enabling request carries the identifier of the background traffic downloading policy, so that the policy and charging rules function device obtains the background traffic downloading policy of the user group according to the background traffic download enabling request and determines policy and charging control in background traffic downloading.

With reference to the third aspect, in a first possible implementation manner of the third aspect, the requirement information includes at least one of the following information: an amount of traffic required by the user group to download background traffic, a time window required by the user group to download background traffic, or area information of the user group.

With reference to the third aspect or the first possible implementation manner of the third aspect, in a second possible implementation manner of the third aspect, before the sending, by an application server, a background traffic downloading request message to a network awareness and schedule device, the method further includes:

obtaining, by the application server, the requirement information.

With reference to the third aspect, or the first or the second possible implementation manner of the third aspect, in a third possible implementation manner of the third aspect, after the receiving, by the application server, an identifier that is of the background traffic downloading policy and that is sent by the network awareness and schedule device, the method further includes:

obtaining, by the application server, an IP address of each user terminal that is in the user group and that needs to download background traffic, where the background traffic download enabling request further includes the IP address of each user terminal that is in the user group and that needs to download background traffic.

According to a fourth aspect, a network awareness and schedule device is disclosed, including:

a receiving unit, configured to receive a background traffic downloading request message sent by an application server, where the background traffic downloading request message carries requirement information required by a user group to download background traffic;

a generation unit, configured to generate a background traffic downloading policy of the user group and an identifier of the background traffic downloading policy according to the requirement information;

a sending unit, configured to send the identifier of the background traffic downloading policy to the application server, where the receiving unit is further configured to receive the identifier that is of the background traffic downloading policy and that is sent by a policy and charging rules function device; and a determining unit, configured to determine the background traffic downloading policy of the user group according to the identifier of the background traffic downloading policy, where the sending unit is further configured to send the background traffic downloading policy to the policy and charging rules function device, so that the policy and charging rules function device determines policy and charging control in background traffic downloading according to the background traffic downloading policy.

According to a fifth aspect, a policy and charging rules function device is disclosed, including:

a receiving unit, configured to receive a background traffic download enabling request sent by an application server, where the background traffic download enabling request carries an identifier of a background traffic downloading policy of a user group;

a sending unit, configured to send the identifier of the background traffic downloading policy to a network awareness and schedule device, where the receiving unit is further configured to receive the background traffic downloading policy that is of the user group and that is returned by the network awareness and schedule device; and a generation unit, configured to determine policy and charging control in background traffic downloading according to the background traffic downloading policy.

According to a sixth aspect, an application server is disclosed, including:

a sending unit, configured to send a background traffic downloading request message to a network awareness and schedule device, where the background traffic downloading request message carries requirement information required by a user group to download background traffic; and a receiving unit, configured to receive an identifier that is of a background traffic downloading policy of the user group and that is sent by the network awareness and schedule device; where the sending unit is further configured to send a background traffic download enabling request to a policy and charging rules function device, where the background traffic download enabling request carries the identifier of the background traffic downloading policy, so that the policy and charging rules function device obtains the background traffic downloading policy of the user group according to the background traffic download enabling request and determines policy and charging control in background traffic downloading.

According to a seventh aspect, a network awareness and schedule device is disclosed, including:

a receiver, configured to receive a background traffic downloading request message sent by an application server, where the background traffic downloading request message carries requirement information required by a user group to download background traffic;

a processor, configured to generate a background traffic downloading policy of the user group and an identifier of the background traffic downloading policy according to the requirement information; and a transmitter, configured to send the identifier of the background traffic downloading policy to the application server; where the receiver is further configured to receive the identifier that is of the background traffic downloading policy and that is sent by a policy and charging rules function device;

the processor is configured to determine the background traffic downloading policy of the user group according to the identifier of the background traffic downloading policy; and the transmitter is further configured to send the background traffic downloading policy to the policy and charging rules function device, so that the policy and charging rules function device determines policy and charging control in background traffic downloading according to the background traffic downloading policy.

According to an eighth aspect, a policy and charging rules function device is disclosed, including:

a receiver, configured to receive a background traffic download enabling request sent by an application server, where the background traffic download enabling request carries an identifier of a background traffic downloading policy of a user group;

a transmitter, configured to send the identifier of the background traffic downloading policy to a network awareness and schedule device, where the receiver is further configured to receive the background traffic downloading policy that is of the user group and that is returned by the network awareness and schedule device; and a processor, configured to determine policy and charging control in background traffic downloading according to the background traffic downloading policy.

According to a ninth aspect, an application server is disclosed, including:

a transmitter, configured to send a background traffic downloading request message to a network awareness and schedule device, where the background traffic downloading request message carries requirement information required by a user group to download background traffic; and a receiver, configured to receive an identifier that is of a background traffic downloading policy of the user group and that is sent by the network awareness and schedule device; where the transmitter is further configured to send a background traffic download enabling request to a policy and charging rules function device, where the background traffic download enabling request carries the identifier of the background traffic downloading policy, so that the policy and charging rules function device obtains the background traffic downloading policy of the user group according to the background traffic download enabling request, and determines policy and charging control in background traffic downloading.

According to a tenth aspect, a system is disclosed, including a network awareness and schedule device, a policy and charging rules function device, and an application server, where the network awareness and schedule device is the network awareness and schedule device according to the fourth aspect of the foregoing technical solutions;

the policy and charging rules function device is the policy and charging rules function device according to the fifth aspect of the foregoing technical solutions; and the application server is the application server according to the sixth aspect of the foregoing technical solutions; or the network awareness and schedule device is the network awareness and schedule device according to the seventh aspect of the foregoing technical solutions;

the policy and charging rules function device is the policy and charging rules function device according to the eighth aspect of the foregoing technical solutions; and the application server is the application server according to the ninth aspect of the foregoing technical solutions.

According to the background traffic downloading method, the device, and the system provided in the embodiments of the present invention, an application server determines requirement information of a user group, and sends, to a network awareness and schedule device, a background traffic downloading request carrying the requirement information. The network awareness and schedule device receives the background traffic downloading request message sent by the application server, and generates a background traffic downloading policy for the group. In the prior art, an application server forwards a background traffic downloading request of each user terminal in a group to a policy and charging rules function device, and the policy and charging rules function device generates a background traffic downloading policy for each user terminal in the group. However, in the present invention, a network side formulates a background traffic downloading policy for a group, instead of formulating a background traffic downloading policy for each user terminal in the group, so as to avoid that the network side repeatedly responds to requests of a same type from the application server. In addition, the application server determines an IP address of a user terminal that is in the group and that needs to download background traffic, so that the policy and charging rules function device generates policy and charging control for the user terminal that needs to download background traffic. Finally, a policy and charging control execution device allocates a bearer resource to the user terminal that needs to download background traffic, so that the application server transmits data to the user terminal that needs to download background traffic. Therefore, network congestion caused due to simultaneous data transmission to all user terminals in the group is avoided.

BRIEF DESCRIPTION OF DRAWINGS

To describe the technical solutions in the embodiments of the present invention more clearly, the following briefly describes the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
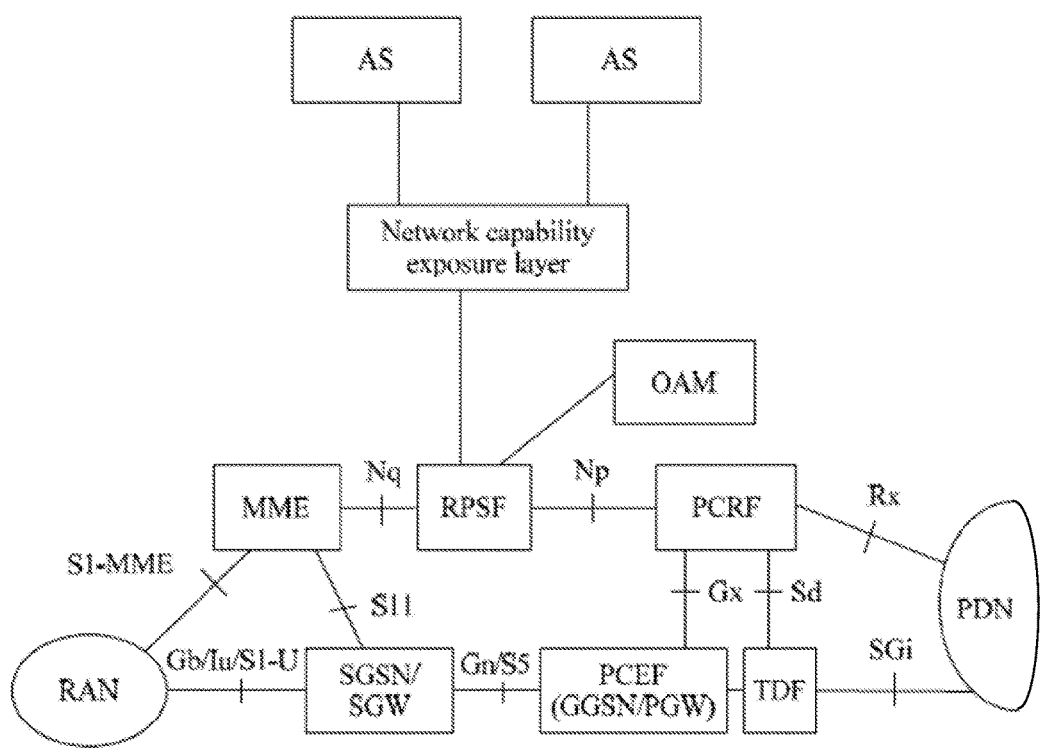
FIG. 1 is an architectural diagram of a background traffic management system according to an embodiment of the present invention.

FIG. 1 shows an architecture of an SAE (system architecture evolution) system in the 3GPP, so as to manage a background traffic resource. The system may include a mobility management entity (MME), a network awareness and schedule (RPSF (RAN (radio access network) payload schedule function)) network element, a policy and charging rules function (PCRF) unit, an application server (for example, an AS in FIG. 1, or a third-party server), a network capability exposure layer, user equipment (UE), and the like. The MME is responsible for mobility management of a control plane, for example, user context management, mobile state management, and allocation of a temporary user identity. The PCRF is configured to formulate a policy control rule and perform flow-based charging. The user equipment is a terminal device performing control plane interaction and user plane interaction with the SAE. The RPSF is configured to collect, analyze, and predict network status information (real-time information and historical information), and support resource scheduling and load control of an access service (for example, a background traffic service) of the application server. The RPSF is connected to the PCRF by using an Np interface and is connected to a mobility management network element by using an Nq interface. An industry user (may be a user related to government and enterprise industries) may be connected to an operator network by using the application server and by using a network capability exposure layer of an operator. The network capability exposure layer may execute capability exposure of the operator network. The application server may be a third-party server, for example, a dedicated server of a government, public security, firefighting, transportation, or another enterprise.

Many user terminals in a user group served by an application server may have a same background traffic downloading requirement. Background traffic downloading described in the embodiments of the present invention refers to transmission of a non-emergent data service (which may be transmitted when a network is idle). Non-emergent data may be transmitted by a server to user equipment in an idle time period of a network. The data may be data used to upgrade an application, data for pushing a message, or the like.

Generally, an area needs to have many user terminals that need to download background traffic. The PCRF formulates a background traffic downloading policy for each user terminal. However, the user terminals may request same data, and request a same time window. This means that the PCRF needs to make repeated responses (to formulate multiple same background traffic downloading policies). This increases network overheads. In addition, if a network side determines a same download time window for the user terminals, the network side simultaneously initiates background traffic transmission to the user terminals. If there are a large quantity of user terminals in a neighboring area, and the network side simultaneously transmits data to the user terminals, the area is prone to network congestion.

The method provided in the embodiments of the present invention is to formulate a background traffic downloading policy for a group, to avoid that a PCRF repeatedly responds to requests from an application server, and avoid network congestion caused by background traffic downloading services.

Embodiment 1

Figure 2:
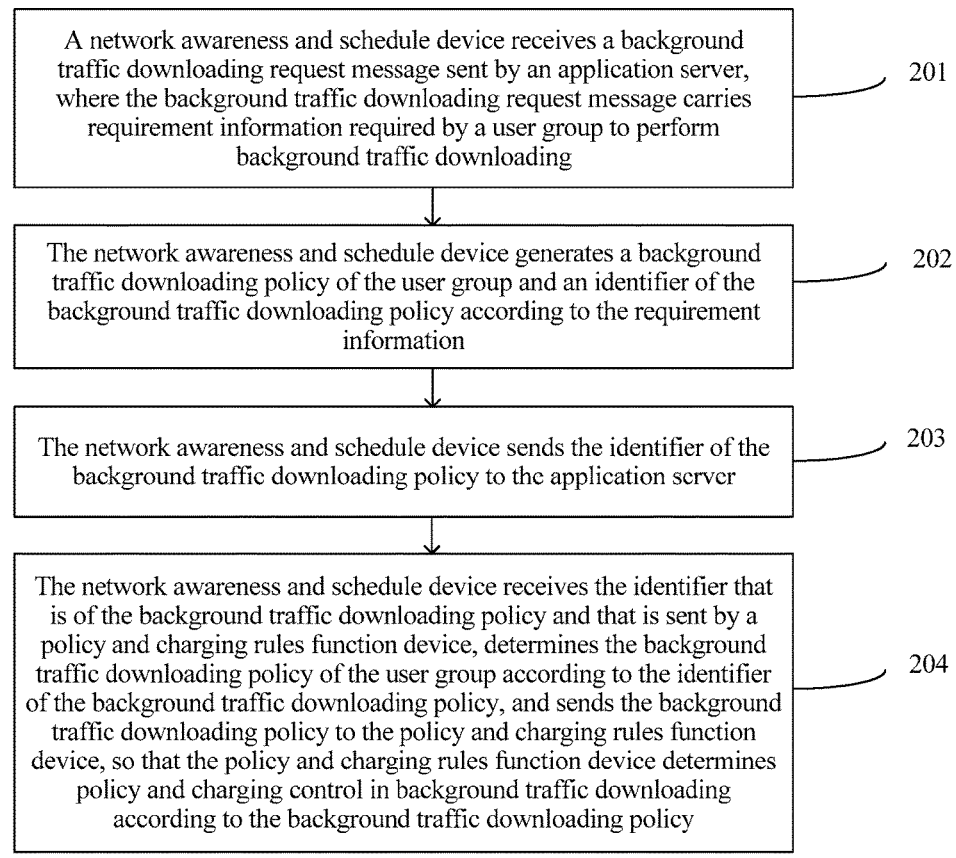
FIG. 2 is a schematic flowchart of a background traffic downloading method according to Embodiment 1 of the present invention.

This embodiment of the present invention further provides a background traffic downloading method. The method may be performed by a network awareness and schedule device. The network awareness and schedule device may be a network awareness and schedule unit RPSF deployed on an operator network. As shown in FIG. 2, the method includes the following steps.

201. The network awareness and schedule device receives a background traffic downloading request message sent by an application server, where the background traffic downloading request message carries requirement information required by a user group to download background traffic.

The requirement information includes at least one of the following information: an amount of traffic required by the user group to download background traffic, a time window required by the user group to download background traffic, or area information of the user group. The user group is one of multiple user groups served by the application server.

It should be noted that the network awareness and schedule device may collect status information of the operator network, to determine whether the operator network supports the background traffic downloading request (a background traffic downloading request initiated by the application server for a first group) from the application server. Background traffic downloading refers to transmission of a non-emergent data service (which may be transmitted when a network is idle), such as terminal application upgrading, terminal database updating, or message pushing.

202. The network awareness and schedule device generates a background traffic downloading policy of the user group and an identifier of the background traffic downloading policy according to the requirement information.

Herein, regardless of which item among the amount of traffic required by the user group to download background traffic, the time window required by the user group to download background traffic, and the area information of the user group is included in the background traffic downloading request message sent by the application server, the network awareness and schedule device may formulate a background traffic downloading policy for the user group. The background traffic downloading policy refers to policy information by using which the user group downloads background traffic. The background traffic downloading policy is used to provide a group service for the user group, to satisfy a background traffic downloading requirement of each user terminal. According to the method provided in the present invention, the network awareness and schedule unit formulates a background traffic downloading policy for the user group to download background traffic, instead of generating a background traffic downloading policy for each user terminal, to avoid that a policy unit (a policy and charging rules function device) of an operator repeatedly responds to same requests from the application server. In addition, the identifier of the background traffic downloading policy is an identifier uniquely corresponding to the background traffic downloading policy. That is, different background traffic downloading policies are corresponding to different identifiers. Therefore, the network awareness and schedule device can determine the background traffic downloading policy according to only the identifier of the background traffic downloading policy.

The application server may be corresponding to multiple groups. Therefore, after generating a corresponding background traffic downloading policy for a background traffic downloading service of each group, the network awareness and schedule device generates a unique corresponding policy identifier for each background traffic downloading policy, so that a background traffic downloading policy can be rapidly determined according to the policy identifier. In addition, the background traffic downloading policy may further include identifier information of the user group. Therefore, it may be determined that the background traffic downloading policy corresponding to the identifier of the background traffic downloading policy is the background traffic downloading policy that is generated by the network awareness and schedule device for the background traffic downloading performed by the user group.

203. The network awareness and schedule device sends the identifier of the background traffic downloading policy to the application server.

Specifically, the network awareness and schedule device may send the policy identifier to the application server by using an exposure platform. The exposure platform (that is, a network capability exposure layer) may have a protocol conversion function.

Herein, the network awareness and schedule device sends the policy identifier to the application server, so that the application server adds the policy identifier to a background traffic download enabling request and sends the background traffic download enabling request to a policy and charging rules function device.

204. The network awareness and schedule device receives the identifier that is of the background traffic downloading policy and that is sent by a policy and charging rules function device, determines the background traffic downloading policy of the user group according to the identifier of the background traffic downloading policy, and sends the background traffic downloading policy to the policy and charging rules function device, so that the policy and charging rules function device determines policy and charging control in background traffic downloading according to the background traffic downloading policy.

The policy and charging rules function device may be a policy and charging rules function PCRF unit. In specific implementation, after receiving the background traffic downloading policy sent by the network awareness and schedule device, the policy and charging rules function device generates, according to the background traffic downloading policy, the policy and charging control in the background traffic downloading performed by the user group, that is, determines a specific network transmission policy that can satisfy the background traffic downloading request of the user group. Then, the policy and charging rules function device sends the policy and charging control to a policy and charging control device. The policy and charging control device allocates, according to the policy and charging control, a bearer resource for the background traffic downloading performed by the user group. Finally, the application server transmits data to each user terminal.

The application server may be corresponding to multiple groups. Therefore, the network awareness and schedule device may formulate corresponding background traffic downloading policies for the multiple groups. In this case, the network awareness and schedule device can determine a unique background traffic downloading policy only according to the policy identifier sent by the policy and charging rules function device.

In an embodiment of the present invention, the background traffic downloading policy includes at least one of the following information:

a permitted download time window, charging information of a single user terminal, a maximum download rate of a single user terminal, a maximum value of an aggregate download rate of the user group, or a charging policy in cases of different aggregate download rates.

The permitted download time window may be a permitted download time window or a determined time window limited by another factor. This is not limited herein. In addition, the background traffic downloading policy may include the following:

the permitted download time window, the maximum download rate of the single user, and the charging information of the single user;

the permitted download time window, the maximum download rate of the single user, and the charging information of the single user; or the permitted download time window, the maximum value of the aggregate download rate of the user group, and the charging policy in cases of different aggregate download rates, where the charging policy in cases of different aggregate download rates may be specifically a charging policy when the aggregate download rate is less than or equal to the maximum value, or a charging policy when the aggregate download rate is greater than the maximum value.

It should be noted that the generated background traffic downloading policy may include multiple permitted download time windows. This is not limited herein.

In an embodiment of the present invention, the method further includes:

if the requirement information includes the time window required by the user group to download background traffic, the background traffic downloading policy includes the permitted download time window, where the time window required by the user group to download background traffic includes the permitted download time window, or the permitted download time window may be included in the time window required by the user group to download background traffic; or if the requirement information includes the amount of traffic required by the user group to download background traffic, the background traffic downloading policy includes the maximum value of the aggregate download rate of the user group or the maximum download rate of the single user terminal in the user group, where the maximum value of the aggregate download rate of the user group or the maximum download rate of the single user terminal in the user group is determined according to the amount of traffic required by the user group to download background traffic.

Specifically, if the amount of traffic required by the user group to download background traffic is a total amount of traffic for the background traffic downloading performed by the user group, the network awareness and schedule device determines the maximum value of the aggregate download rate of the user group according to the total amount of traffic and the permitted download time window. If the amount of traffic required by the user group to download background traffic is a product of a unit amount of traffic for background traffic downloading performed by a single user terminal in the user group and a quantity of user terminals in the user group, the network awareness and schedule device determines a maximum download rate of the single user terminal in the user group according to the unit amount of traffic and the permitted download time window.

In addition, if the requirement information includes the area information of the user group, the network awareness and schedule unit determines, according to a network status of an area corresponding to the area information of the user group, whether the network can satisfy the background traffic downloading request of the user group.

In an embodiment of the present invention, if the requirement information includes the time window required by the user group to download the background traffic, before the network awareness and schedule unit generates the background traffic downloading policy of the user group and the identifier of the background traffic downloading policy according to the requirement information, the method further includes:

determining, by the network awareness and schedule unit, whether the network satisfies, within the time window required by the user group to download background traffic, the background traffic downloading request from the application server. If the network awareness and schedule unit determines that the network can satisfy, within the time window required by the user group to download background traffic, the background traffic downloading request from the application server, the network awareness and schedule unit performs the "generating a background traffic downloading policy of the user group and an identifier of the background traffic downloading policy according to the requirement information".

In an embodiment of the present invention, if the network awareness and schedule unit determines that the network cannot satisfy, within the time window required by the user group to download background traffic, the background traffic downloading request from the application server, the network awareness and schedule unit generates a message indicating a policy generation failure, and sends, to the application server, the message indicating a policy generation failure.

In an embodiment of the present invention, after the network awareness and schedule unit sends, to the application server, the message indicating a policy generation failure, the method further includes:

The network awareness and schedule unit sends timing information to the application server, so that the application server sends the background traffic downloading request message to the network awareness and schedule unit by using the exposure platform at an interval of the timing information.

According to the background traffic downloading method provided in this embodiment of the present invention, after receiving a background traffic downloading request message that is sent by an application server to request to set up a background traffic downloading service for a user group, a network awareness and schedule device determines, according to a network status and requirement information of the user group to download background traffic, whether a network can satisfy the background traffic downloading request (a background traffic downloading request initiated by the application server for the user group) from the application server. After determining that the network can satisfy the background traffic downloading request of the user group, the network awareness and schedule device generates a background traffic downloading policy for the user group and generates a policy identifier of the background traffic downloading policy, so as to determine the background traffic downloading policy of the user group according to the policy identifier. According to the method provided in this embodiment of the present invention, the network awareness and schedule device (may be a network awareness and schedule RPSF unit) generates a background traffic downloading policy for a user group, instead of generating a background traffic downloading policy for each user terminal, so as to reduce network overheads.

Figure 3:
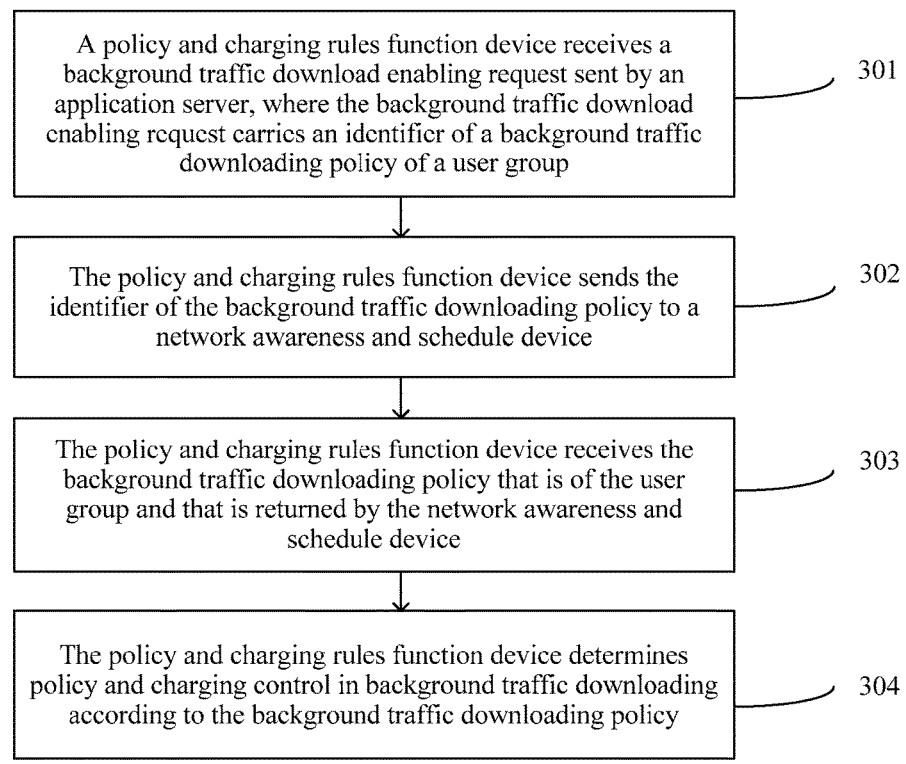
FIG. 3 is a schematic flowchart of another background traffic downloading method according to Embodiment 1 of the present invention.

This embodiment of the present invention further provides a background traffic downloading method. The method is performed by a policy and charging rules function device. The policy and charging rules function device may be a policy and charging rules function PCRF unit deployed on an operator network. As shown in FIG. 3, the method includes the following steps.

301. The policy and charging rules function device receives a background traffic download enabling request sent by an application server, where the background traffic download enabling request carries an identifier of a background traffic downloading policy of a user group.

Herein, a premise is that a network awareness and schedule device determines that the network can satisfy a background traffic downloading request of the user group, formulates the background traffic downloading policy for the user group, and sends the identifier of the background traffic downloading policy to the application server. Then, the application server sends the background traffic download enabling request to the policy and charging rules function device.

302. The policy and charging rules function device sends the identifier of the background traffic downloading policy to a network awareness and schedule device.

The policy and charging rules function device requests the background traffic downloading policy of the user group from the network awareness and schedule device according to the identifier that is of the background traffic downloading policy and that is included in the background traffic download enabling request.

Specifically, the policy and charging rules function device sends the identifier of the background traffic downloading policy to the network awareness and schedule device, so that the network awareness and schedule device can determine, according to the identifier that is of the background traffic downloading policy and that is included in the background traffic download enabling request, a background traffic downloading policy from multiple background traffic downloading policies (background traffic downloading policies generated for background traffic downloading services of different user groups) generated by the network awareness and schedule device, that is, the background traffic downloading policy generated by the network awareness and schedule device for background traffic downloading performed by the user group.

303. The policy and charging rules function device receives the background traffic downloading policy that is of the user group and that is returned by the network awareness and schedule device.

Herein, the network awareness and schedule device previously generates a corresponding background traffic downloading policy for the user group and an identifier of the background traffic downloading policy according to requirement information required by the user group to download background traffic. In addition, the identifier of the background traffic downloading policy may include identifier information of the user group. Therefore, the policy and charging rules function device determines, according to the identifier information that is of the group and that is included in the identifier of the background traffic downloading policy, that the background traffic downloading policy is the background traffic downloading policy corresponding to the user group.

304. The policy and charging rules function device determines policy and charging control in background traffic downloading according to the background traffic downloading policy.

Actually, the policy and charging rules function device determines a specific network transmission policy according to the background traffic downloading policy that is generated by the network awareness and schedule device for the user group.

It should be noted that the policy and charging control may include many parameters. Some parameters are responsible for charging, and some parameters are responsible for other control. In the present invention, the policy and charging control may include only some of the parameters.

In an embodiment of the present invention, if the background traffic download enabling request further includes an IP address of each user terminal that is in the user group and that needs to download background traffic, generating, by the policy and charging rules function device according to the background traffic downloading policy, policy control and charging control required by the user group to download background traffic includes:

determining, by the policy and charging rules function device according to the background traffic downloading policy and the IP address of each user terminal that is in the user group and that needs to download background traffic, a dedicated-bearer establishment moment and a maximum download rate for each user terminal that is in the user group and that needs to download background traffic.

In an embodiment of the present invention, the policy and charging rules function device sends the policy and charging control to a policy and charging enforcement function device, so that the policy and charging enforcement function device allocates, according to the policy and charging control, a bearer resource for the background traffic downloading.

In addition, in the previous embodiment, the policy and charging rules function device determines the dedicated-bearer establishment moment and the maximum download rate for each user terminal that is in the user group and that needs to download background traffic, so that the application server can transmit data to a user terminal that needs to download background traffic. Therefore, network congestion caused due to simultaneous data transmission to all user terminals in the user group can be avoided to some extent.

In an embodiment of the present invention, the determining, by the policy and charging rules function device, policy and charging control in background traffic downloading according to the background traffic downloading policy specifically includes:

The policy and charging rules function unit determines a same dedicated-bearer establishment moment and a same maximum download rate for the user terminals according to the background traffic downloading policy; or the policy and charging rules function unit determines a dedicated-bearer establishment moment and a maximum download rate for each user terminal according to the background traffic downloading policy, where the user terminals do not have a same bearer establishment moment, and the user terminals do not have a same maximum download rate.

The bearer establishment moments of the user terminals are moments in a permitted download time window included in the background traffic downloading policy.

It should be noted that a bearer establishment time of each user terminal is not limited, provided that the bearer establishment time is in a time window in the background traffic downloading policy.

According to the background traffic downloading method provided in this embodiment of the present invention, a policy and charging rules function device receives a background traffic download enabling request (a request sent for background traffic downloading performed by a user group) sent by an application server, and requests a corresponding background traffic downloading policy from a network awareness and schedule device according to an identifier that is of a background traffic downloading policy and that is carried in the background traffic download enabling request. The policy and charging rules function device generates, according to the background traffic downloading policy returned by the network awareness and schedule device, policy and charging control in the background traffic downloading performed by the user group. In addition, if the background traffic download enabling request received by the policy and charging rules function device includes an IP address of each user terminal that is in the user group and that needs to download background traffic, the policy and charging rules function device can generate, according to the IP address of each user terminal, policy and charging control for each user terminal that needs to download background traffic, so that a policy and charging control execution device allocates a bearer resource to each user terminal that needs to download the background traffic, and the application server transmits data to each user terminal that needs to download background traffic. In this case, network congestion caused due to simultaneous data transmission to user terminals in the group is avoided.

Figure 4:
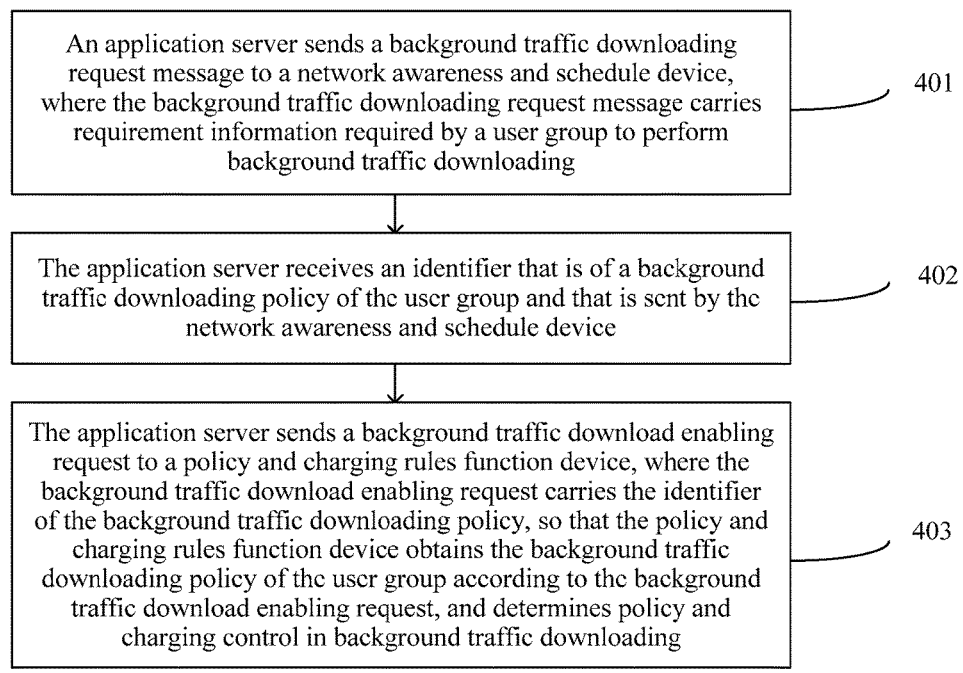
FIG. 4 is a schematic flowchart of another background traffic downloading method according to Embodiment 1 of the present invention.

This embodiment of the present invention provides a background traffic downloading method. The method is performed by an application server. The application server is corresponding to at least one group. As shown in FIG. 4, the method includes the following steps.

401. The application server sends a background traffic downloading request message to a network awareness and schedule device, where the background traffic downloading request message carries requirement information required by a user group to download background traffic.

The requirement information includes at least one of the following information: an amount of traffic required by the user group to download background traffic, a time window required by the user group to download background traffic, or area information of the user group.

In addition, the user group is at least one group that is in the group corresponding to the application server and that needs to download background traffic. The application server may be a third-party server, for example, a server of an industry such as a government or public security. Multiple users or all users in the user group receive background traffic information from the application server. The background traffic information may be system information of a group application, or periodic information subscribed by all users in a group, or any other type of information with same content. The amount of traffic required by the user group to download background traffic is an amount of traffic that is estimated by the application server and that is required by the user group to download background traffic. The area information of the user group refers to area information that is selected by the application server and that is of area coverage in which a background traffic downloading service is provided. The area coverage is corresponding to one or more of a tracking area, an eNB, a cell, a routing area, or a service area of an operator.

According to the background traffic downloading method provided in the present invention, an application server sends, to a network awareness and schedule device, requirement information required by a user group to download background traffic, so that the network awareness and schedule device formulates a background traffic downloading policy for the group, so as to avoid that a policy rules function unit (may be a PCRF) on a network side repeatedly responds to a same request, and reduce network overheads.

402. The application server receives an identifier that is of a background traffic downloading policy of the user group and that is sent by the network awareness and schedule device.

Herein, the application server receives the identifier that is of the background traffic downloading policy of the user group and that is sent by the network awareness and schedule device. This proves that the network awareness and schedule device determines that a network satisfies the background traffic downloading request (that is, a background traffic downloading request initiated by the application server for the user group) from the application server, and that the network awareness and schedule device generates the background traffic downloading policy for the user group. If the application server does not receive the identifier that is of the background traffic downloading policy of the user group and that is sent by the network awareness and schedule device, the application server receives a message that is sent by the network awareness and schedule device and that indicates a policy generation failure. This proves that the network awareness and schedule device determines that a network cannot satisfy the background traffic downloading request from the application server.

In addition, it may be further determined, according to identifier information that is of the user group and that is carried in the identifier of the background traffic downloading policy of the user group, that the background traffic downloading policy is the background traffic downloading policy formulated for the user group.

403. The application server sends a background traffic download enabling request to a policy and charging rules function device, where the background traffic download enabling request carries the identifier of the background traffic downloading policy, so that the policy and charging rules function device obtains the background traffic downloading policy of the user group according to the background traffic download enabling request and determines policy and charging control in background traffic downloading.

The policy and charging rules function device may be a PCRF on the operator network, is connected to an RPSF by using an Np interface, and implements a policy and charging rules function.

Herein, first, the application server needs to send the background traffic download enabling request to the PCRF. Then, the PCRF requests, from the RPSF, the background traffic downloading policy (that is, the background traffic downloading policy generated by the RPSF for the user group) corresponding to the identifier that is of the background traffic downloading policy of the user group and that is included in the background traffic download enabling request sent by the application server. Finally, the PCRF obtains the background traffic downloading policy of the user group according to the background traffic download enabling request and determines the policy and charging control in the background traffic downloading. Then, the PCRF sends the policy and charging control to a policy and charging control execution device, and the policy and charging control execution device allocates a bearer resource to a user terminal in the user group according to the policy and charging control. Finally, the application server transmits data to the user terminal in the user group.

In an embodiment of the present invention, before the application server sends the background traffic downloading request message to the network awareness and schedule device, the method further includes:

The application server obtains the requirement information, generates the background traffic downloading request message carrying the requirement information, and sends the background traffic downloading request message to a network awareness and schedule unit, so that the network awareness and schedule unit generates the background traffic downloading policy of the user group and the identifier of the background traffic downloading policy according to the requirement information.

The network awareness and schedule device may be an RPSF on the operator network, and is configured to: collect, analyze, and predict network status information of the operator network, and support the application server in managing and invoking a network resource of the operator network. In addition, the application server may send the background traffic downloading request message to the network awareness and schedule unit by using an exposure platform (a network capability exposure layer). The exposure platform is connected to the application server and the RPSF, to implement communication between the application server and the operator network. The exposure platform may have a protocol conversion function and may convert an interface protocol from an operator domain and an interface protocol used by an external server (for example, the application server described in this embodiment of the present invention).

In an embodiment of the present invention, after the application server receives the identifier that is of the background traffic downloading policy and that is sent by the network awareness and schedule device, the method further includes:

obtaining, by the application server, an IP address of each user terminal that is in the user group and that needs to download background traffic.

The background traffic download enabling request further includes the IP address of each user terminal that is in the user group and that needs to download background traffic, so that the policy and charging rules function device determines the policy and charging control for each user terminal that is in the user group and that needs to download background traffic, that is, a dedicated-bearer establishment moment and a maximum download rate of a user terminal that is in the user group and that needs to download background traffic. The user terminals do not have a same dedicated-bearer establishment moment, and the user terminals do not have a same maximum download rate.

In an embodiment of the present invention, the application server obtains a total amount of traffic for the background traffic downloading performed by all the user terminals in the user group, and uses the total amount of traffic as the amount of traffic required by the user group to download background traffic.

Alternatively, the application server obtains a quantity of user terminals in the user group and a unit amount of traffic required by a single user terminal to download background traffic, and uses a product of the unit amount of traffic and the quantity of user terminals in the user group as the amount of traffic required by the user group to download background traffic. The user terminals require a same amount of traffic to download background traffic.

In an embodiment of the present invention, the obtaining the time window required by the user group to download background traffic specifically includes:

The application server obtains a time period required by the user group to download background traffic, and determines the time period as the time window required by the user group to download background traffic.

Alternatively, the application server determines a start moment of the background traffic downloading performed by the user group and timing information starting from the start moment, and determines, according to the start moment and the timing information starting from the start moment, the time window required by the user group to download background traffic.

In an embodiment of the present invention, the area information of the user group is area information of an area corresponding to the user group. The area corresponding to the user group is corresponding to one or more of a tracking area, an evolved NodeB eNB, a routing area, or a cell that is defined by an operator.

In an embodiment of the present invention, the application server receives a message that is sent by the network awareness and schedule unit and that indicates a policy generation failure.

The application server receives timing information sent by the network awareness and schedule unit, and sends, after an interval of the timing information, the background traffic downloading request message to the network awareness and schedule unit by using the exposure platform.

According to the background traffic downloading method provided in this embodiment of the present invention, an application server obtains requirement information required by a group to download background traffic, so that a network awareness and schedule device on an operator network generates a background traffic downloading policy for the group to download background traffic, to avoid that the network awareness and schedule device repeatedly responds to same requests from the application server and formulates same background traffic downloading policies for user terminals in the user group. In addition, after determining that a network side satisfies a background traffic downloading request of the group, the application server determines an IP address of a user terminal that is in the group and that needs to download background traffic, so that a policy and charging rules function device on the operator network determines policy and charging control for each user terminal that is in the user group and that needs to download background traffic. Then, a policy and charging control execution device allocates a bearer resource to the user terminal that is in the user group and that needs to download background traffic. Finally, the application server transmits data to the user terminal that is in the user group and that needs to download background traffic. Therefore, network congestion caused due to simultaneous data transmission to all the user terminals in the group can be avoided to some extent.

Embodiment 2

Figure 5A:
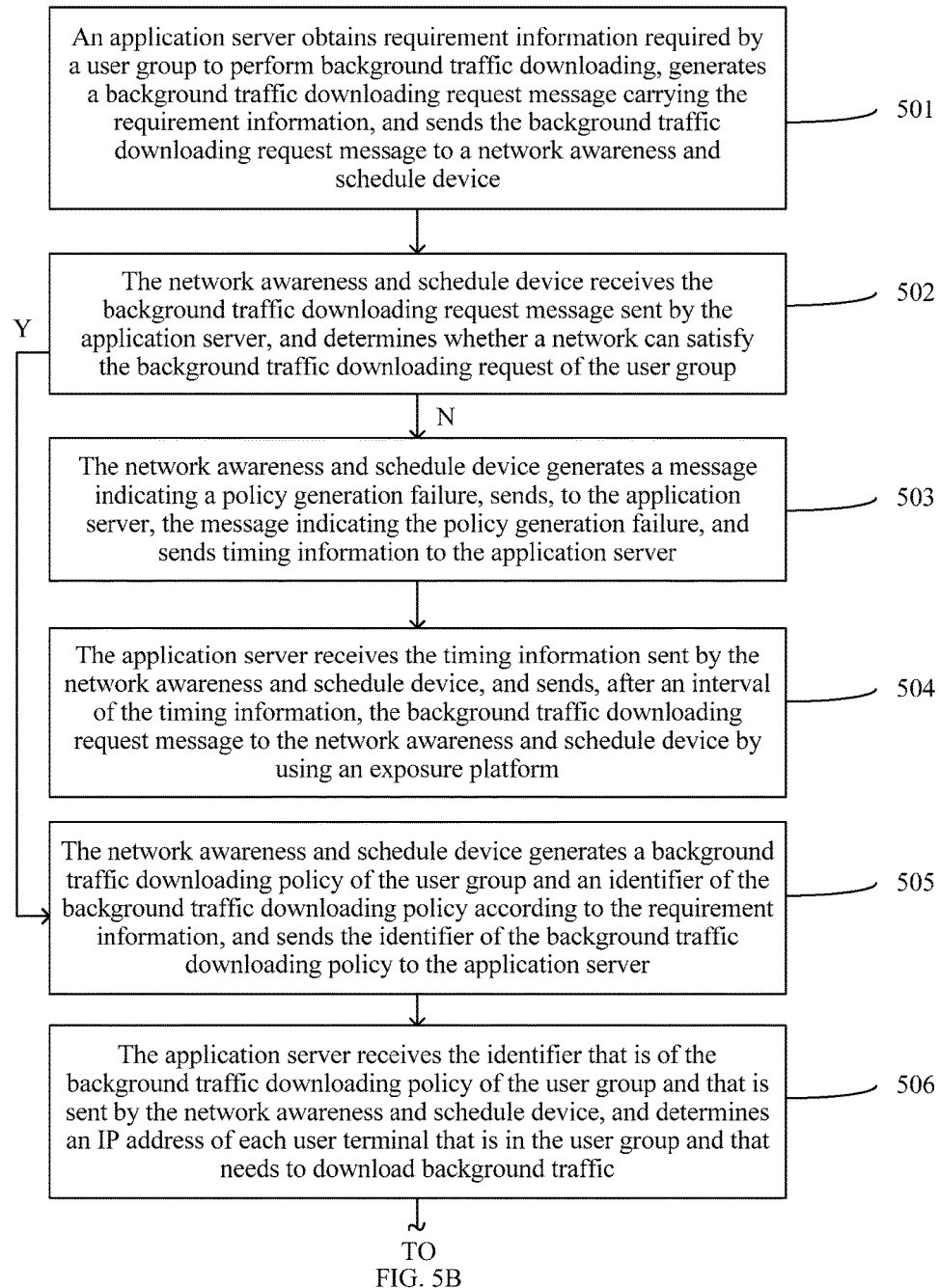
FIG. 5A and FIG. 5B are a schematic flowchart of another background traffic downloading method according to Embodiment 2 of the present invention.
Figure 5B:
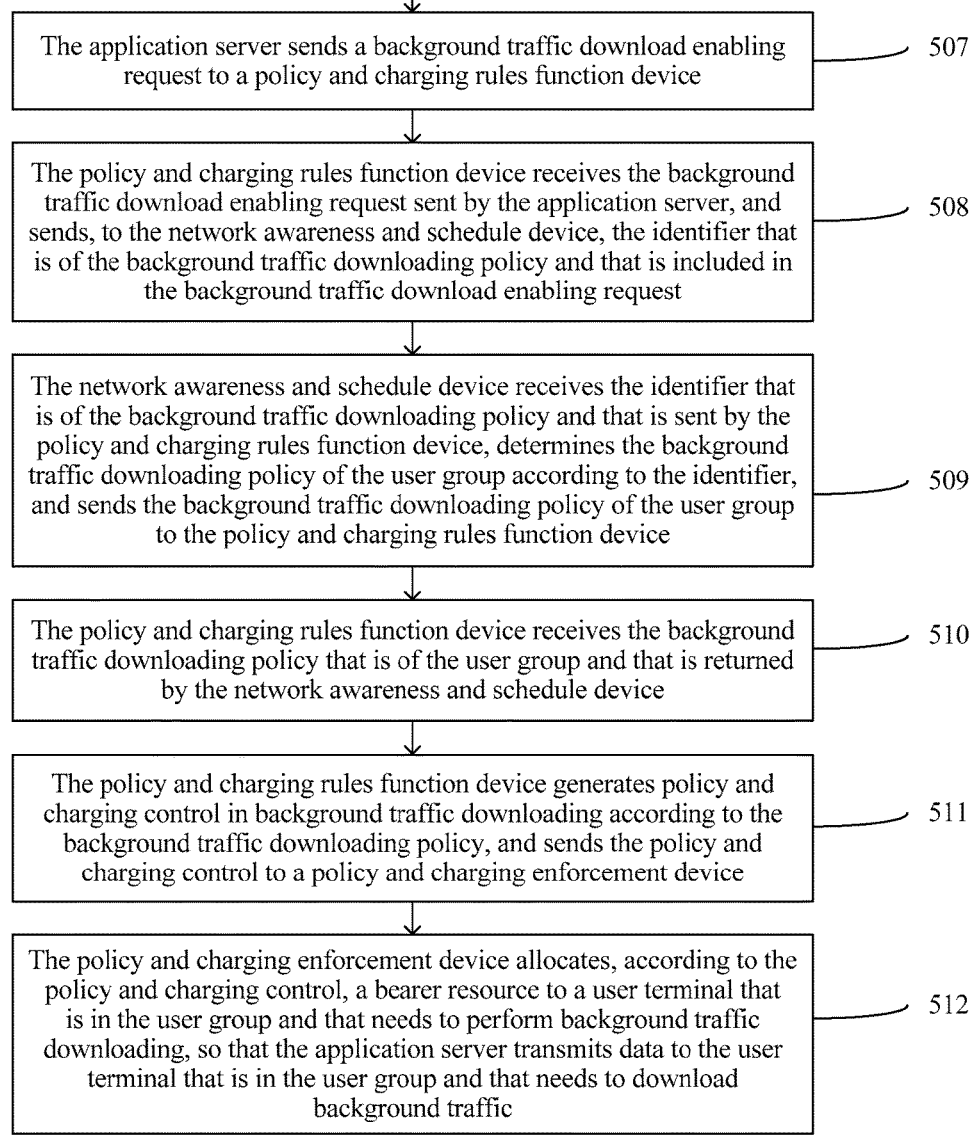

This embodiment of the present invention provides a background traffic downloading method. The background traffic downloading method is applied to a background traffic management system. The background traffic management system includes an application server, an exposure platform (a network capability exposure layer), a network awareness and schedule device providing a network awareness and schedule function (for example, an RPSF), and a policy and charging rules function device providing a policy and charging rules function (for example, a PCRF). As shown in FIG. 5A and FIG. 5B, the method includes the following steps.

501. The application server obtains requirement information required by a user group to download background traffic, generates a background traffic downloading request message carrying the requirement information, and sends the background traffic downloading request message to the network awareness and schedule device.

The user group includes at least one user terminal. The requirement information includes at least one of the following information: an amount of traffic required by the user group to download background traffic, a time window required by the user group to download background traffic, or area information of the user group.

The following explains the requirement information of background traffic downloading performed by the user group: The amount of traffic required by the user group to download background traffic may be a total amount of traffic required by all users in the user group to download background traffic. Alternatively, a quantity of users in the user group and a unit amount of traffic required by a single user to download background traffic may be obtained, and the amount of traffic required by the user group to download background traffic is determined according to the quantity of users in the user group and the unit amount of traffic. It should be noted that it is assumed herein that the users in the user group require a same amount of traffic (a received amount of background traffic) to download background traffic.

According to the method provided in this embodiment of the present invention, requirement information of a group to download background traffic is determined, so that a network awareness and schedule device generates a background traffic downloading policy for the group, to avoid that a policy and charging rules function device repeatedly responds to same requests and generates same background traffic downloading policies for multiple times, and reduce network overheads.

For example, if there are ten user terminals in a user group, and each user terminal sends a background traffic downloading request to the application server, the policy and charging rules function device generates ten background traffic downloading policies for the ten user terminals. However, according to the method provided in this embodiment of the present invention, the network awareness and schedule device needs to generate only one background traffic downloading policy for the ten user terminals in the group, to implement background traffic downloading services requested by the user terminals.

502. The network awareness and schedule device receives the background traffic downloading request message sent by the application server, and determines whether a network can satisfy the background traffic downloading request of the user group.

The background traffic downloading request message carries the requirement information required by the user group to download background traffic.

When the requirement information includes the time window required by the user group to download background traffic, the network awareness and schedule device needs to determine whether the network satisfies, within the time window required by the user group to download background traffic, the background traffic downloading request from the application server. In this embodiment, it is assumed that the requirement information includes the time window required by the user group to download background traffic.

For example, if the requirement information includes the time window required by the user group to download background traffic, the network awareness and schedule device determines whether the operator network can satisfy, within the time window required by the user group to download background traffic, the background traffic downloading request from the application server. It should be noted that, if the requirement information of the user group does not include the time window required by the user group to download background traffic, the network awareness and schedule device may not determine whether the network can satisfy the background traffic downloading request from the application server, and step 505 is directly performed.

If the network awareness and schedule device determines that the network cannot satisfy the background traffic downloading request from the application server, step 503 is performed. If the network awareness and schedule device determines that the network can satisfy the background traffic downloading request from the application server, step 505 is performed.

503. The network awareness and schedule device generates a message indicating a policy generation failure, sends, to the application server, the message indicating the policy generation failure, and sends timing information to the application server.

Herein, if the requirement information of the user group to download background traffic includes the time window required by the user group to download background traffic, and the network awareness and schedule device determines that the operator network cannot satisfy, within the time window required by the user group to download background traffic, the background traffic downloading request sent by the application server, the network awareness and schedule device generates the message indicating the policy generation failure. A failure cause value included in the message indicating the policy generation failure is that a network status does not satisfy a condition.

The network awareness and schedule device sends the timing information to the application server, so that the application server sends, after an interval of the timing information, the background traffic downloading request message to the network awareness and schedule device by using the exposure platform. If the network awareness and schedule device determines that the operator network still cannot satisfy the background traffic downloading request from the application server, the application server may send, after the interval of the timing information, the background traffic downloading request message to the network awareness and schedule device again by using the exposure platform.

504. The application server receives the timing information sent by the network awareness and schedule device, and sends, after an interval of the timing information, the background traffic downloading request message to the network awareness and schedule device by using an exposure platform.

505. The network awareness and schedule device generates a background traffic downloading policy of the user group and an identifier of the background traffic downloading policy according to the requirement information, and sends the identifier of the background traffic downloading policy to the application server.

The identifier of the background traffic downloading policy may further include identifier information of the user group.

It should be noted that, if the requirement information of background traffic downloading performed by the user group includes the area information of the user group, the network awareness and schedule device may determine whether a network of a corresponding area satisfies the background traffic downloading request of the user group. Referring to FIG. 1, that the network awareness and schedule device (for example, an RPSF) obtains a network status of the area corresponding to the user group (an area corresponding to the area information of the user group) specifically includes: The RPSF obtains network status information of the corresponding area from a PCRF by using an Np interface or from an MME by using an Nq interface. The network status information includes a network load status and a congestion status in the area, and may further include information such as a predicted network status in a future period.

For example, the network awareness and schedule device may generate the background traffic downloading policy for the user group according to the requirement information of the user group in the following manners:

1. If the requirement information of the user group includes the time window required by the user group to download background traffic, the network awareness and schedule device determines, according to the network, a permitted download time window within the time window required by the user group to download background traffic. The time window required by the user group to download background traffic includes the permitted download time window, or the permitted download time window is included in the time window required by the user group to download background traffic.

2. If the requirement information of the user group includes the amount of traffic required by the user group to download background traffic, and the amount of traffic required by the user group to download background traffic is a total amount of traffic for background traffic downloading performed by the user terminals in the user groups, the network awareness and schedule device determines an aggregate download rate of the user group according to the total amount of traffic. If the amount of traffic required by the user group to download background traffic is a product of a quantity of user terminals in the user group and a unit amount of traffic required by a single user terminal in the user group to download background traffic, the network awareness and schedule device determines a maximum download rate of the single user according to the unit amount of traffic.

Generally, the application server may be corresponding to multiple groups, and the application server may request background traffic downloading for the multiple groups. The network awareness and schedule device may formulate background traffic downloading policies for the multiple groups to download background traffic. Therefore, after generating a background traffic downloading policy for each group, the network awareness and schedule device further generates an identifier for each background traffic downloading policy. For example, if the user group is one of the multiple groups corresponding to the application server, after generating the background traffic downloading policy for the user group, the network awareness and schedule device further generates the identifier of the background traffic downloading policy. The identifier may further include the identifier information of the user group, so as to determine that the background traffic downloading policy is the background traffic downloading policy generated for the user group.

506. The application server receives the identifier that is of the background traffic downloading policy of the user group and that is sent by the network awareness and schedule device, and determines an IP address of each user terminal that is in the user group and that needs to download background traffic.

Herein, if the application server receives the identifier that is of the background traffic downloading policy of the user group and that is sent by the network awareness and schedule device, it indicates that the background traffic downloading policy of the user group is generated successfully. Further, the application server determines the IP address of each user terminal that is in the user group and that needs to download the background traffic, so that a network side pertinently transmits data to a user terminal that needs to download background traffic, instead of simultaneously transmitting data to all the user terminals in the group. Therefore, network congestion caused due to simultaneous data transmission to all the user terminals in the group can be relieved to some extent.

507. The application server sends a background traffic download enabling request to the policy and charging rules function device.

The background traffic download enabling request includes the identifier that is of the background traffic downloading policy and that is generated by the network awareness and schedule device for the user group and the IP address of each user terminal that is in the user group and that needs to download background traffic, so that the policy and charging rules function device determines, according to the background traffic downloading policy and the IP address of each user terminal that is in the user group and that needs to download background traffic, a dedicated-bearer establishment moment and a maximum download rate for each user terminal that is in the user group and that needs to download the background traffic.

508. The policy and charging rules function device receives the background traffic download enabling request sent by the application server, and sends, to the network awareness and schedule device, the identifier that is of the background traffic downloading policy and that is included in the background traffic download enabling request.

According to step 507, the background traffic download enabling request includes the identifier that is of the background traffic downloading policy and that is generated by the network awareness and schedule device for the user group, and the background traffic downloading policy of the user group is obtained from the network awareness and schedule device according to the identifier of the background traffic downloading policy.

509. The network awareness and schedule device receives the identifier that is of the background traffic downloading policy and that is sent by the policy and charging rules function device, determines the background traffic downloading policy of the user group according to the identifier, and sends the background traffic downloading policy of the user group to the policy and charging rules function device.

Herein, the network awareness and schedule device determines, according to the identifier sent by the policy and charging rules function device, a background traffic downloading policy from multiple background traffic downloading policies formulated by the network awareness and schedule device, and sends the background traffic downloading policy to the policy and charging rules function device, so that the policy and charging rules function device determines policy and charging control in background traffic downloading according to the background traffic downloading policy.

510. The policy and charging rules function device receives the background traffic downloading policy that is of the user group and that is returned by the network awareness and schedule device.

In addition, the identifier of the background traffic downloading policy may further include the identifier information of the user group. The policy and charging rules function device may determine, according to the identifier information that is of the user group and that is included in the identifier of the background traffic downloading policy, that the background traffic downloading policy is the background traffic downloading policy generated by the network awareness and schedule unit for the user group.

511. The policy and charging rules function device determines policy and charging control in background traffic downloading according to the background traffic downloading policy, and sends the policy and charging control to a policy and charging enforcement function device.

Herein, the policy and charging rules function device sends the policy and charging control to the policy and charging enforcement function device, so that the policy and charging enforcement function device allocates, according to the policy and charging control, a bearer resource for the background traffic downloading.

In specific implementation, the policy and charging rules function device determines a PCC (policy and charging control) policy for a user terminal that is in the user group and that needs to download background traffic. The user terminal described herein is a user terminal that needs to download background traffic. The PCC policy is a bearer establishment moment of a single user terminal and a maximum download rate of the single user. The user terminals have a same trigger moment, that is, the foregoing bearer establishment moment. The user terminals also have a same maximum download rate.

Alternatively, the PCC policy is bearer establishment moments of the user terminals and maximum download rates of the users. The user terminals have different trigger moments. That is, dedicated-bearer establishment moments are different. The user terminals have different maximum download rates.

It should be noted that, regardless of whether the user terminals have a same bearer establishment moment, the bearer establishment moment of each user terminal should be a moment in the permitted download time window included in the background traffic downloading policy fed back by the network awareness and schedule device.

512. The policy and charging enforcement function device allocates, according to the policy and charging control, a bearer resource to a user terminal that is in the user group and that needs to download background traffic, so that the application server transmits data to the user terminal that is in the user group and that needs to download background traffic.

If a PCC policy determined by the policy and charging rules function device for a background traffic downloading service requested by the user group in step 511 is a dedicated-bearer establishment moment of a single user terminal and a maximum download rate of the single user, the application server simultaneously transmits data to the user terminals that need to download background traffic. If the IP address of each user terminal that is in the user group and that needs to download the background traffic is not determined in step 506, network congestion may be caused because the application server simultaneously transmits data to the user terminals in the user group. If data is transmitted only to a user terminal that is in the user group and that needs to download background traffic, network congestion can be avoided to some extent.

If a PCC policy determined by the policy and charging rules function device for a background traffic downloading service requested by the user group in step 511 is dedicated-bearer establishment moments of the user terminals and maximum download rates of the users, a policy and charging control execution device allocates, at a dedicated-bearer establishment moment of each user terminal that needs to download background traffic, a bearer resource to each user terminal that needs to download background traffic, and the application server transmits, at different moments, data to the user terminals that need to download background traffic.

According to the background traffic downloading method provided in this embodiment of the present invention, an application server determines requirement information of background traffic downloading performed by a user group, and sends, to a network awareness and schedule unit, a background traffic downloading request carrying the requirement information. The network awareness and schedule unit receives the background traffic downloading request message sent by the application server, and generates a background traffic downloading service for the group. In the prior art, an application server forwards a background traffic downloading request of each user terminal in a group to a network side, and a policy and charging rules function device generates a background traffic downloading policy for each user terminal in the group. However, in the present invention, the network awareness and schedule unit generates a background traffic downloading policy for a group, instead of generating a background traffic downloading policy for each user terminal in the group, so as to avoid that a network side repeatedly responds to requests of a same type from the application server. In addition, the application server determines an IP address of a user terminal that is in the group and that needs to download background traffic, so that the application server transmits data to the user terminal that needs to download the background traffic. Therefore, network congestion caused due to simultaneous data transmission to all user terminals in the group is avoided.

Embodiment 3

This embodiment of the present invention provides a background traffic downloading method. The background traffic downloading method is applied to a background traffic management system. The background traffic management system includes an application server, an exposure platform (a network capability exposure layer), a network awareness and schedule device providing a network awareness and schedule function (for example, an RPSF), and a policy and charging rules function device providing a policy and charging rules function (for example, a PCRF). A unique difference between this embodiment and the foregoing Embodiment 2 is as follows:

If the background traffic downloading policy generated in step 505 is a permitted download time window, a maximum value of an aggregate download rate of the user group, a charging policy when the aggregate download rate is less than or equal to the maximum value, and a charging policy when the aggregate download rate is greater than the maximum value, after step 512, the method further includes:

A policy and charging control execution device (may be an online charging unit, online charging system OCS) collects a current aggregate download rate, and sends the current aggregate download rate to the policy and charging rules function device. The policy and charging rules function device determines whether the current aggregate download rate is greater than the maximum value of the aggregate download rate specified in the background traffic downloading policy, and sends, to the policy and charging control execution device, charging information in cases of different aggregate download rates. The policy and charging control execution device performs accurate charging according to corresponding charging information.

If the current aggregate download rate is less than or equal to the maximum value of the aggregate download rate specified in the background traffic downloading policy, charging is performed according to the charging policy in the background traffic downloading policy when the current aggregate download rate is less than or equal to the maximum value of the aggregate download rate specified in the background traffic downloading policy.

If the current aggregate download rate is greater than the maximum value of the aggregate download rate specified in the background traffic downloading policy, charging is performed according to the charging policy that is in the background traffic downloading policy and when the current aggregate download rate is greater than the maximum value of the aggregate download rate specified in the background traffic downloading policy.

Embodiment 4

Figure 6:
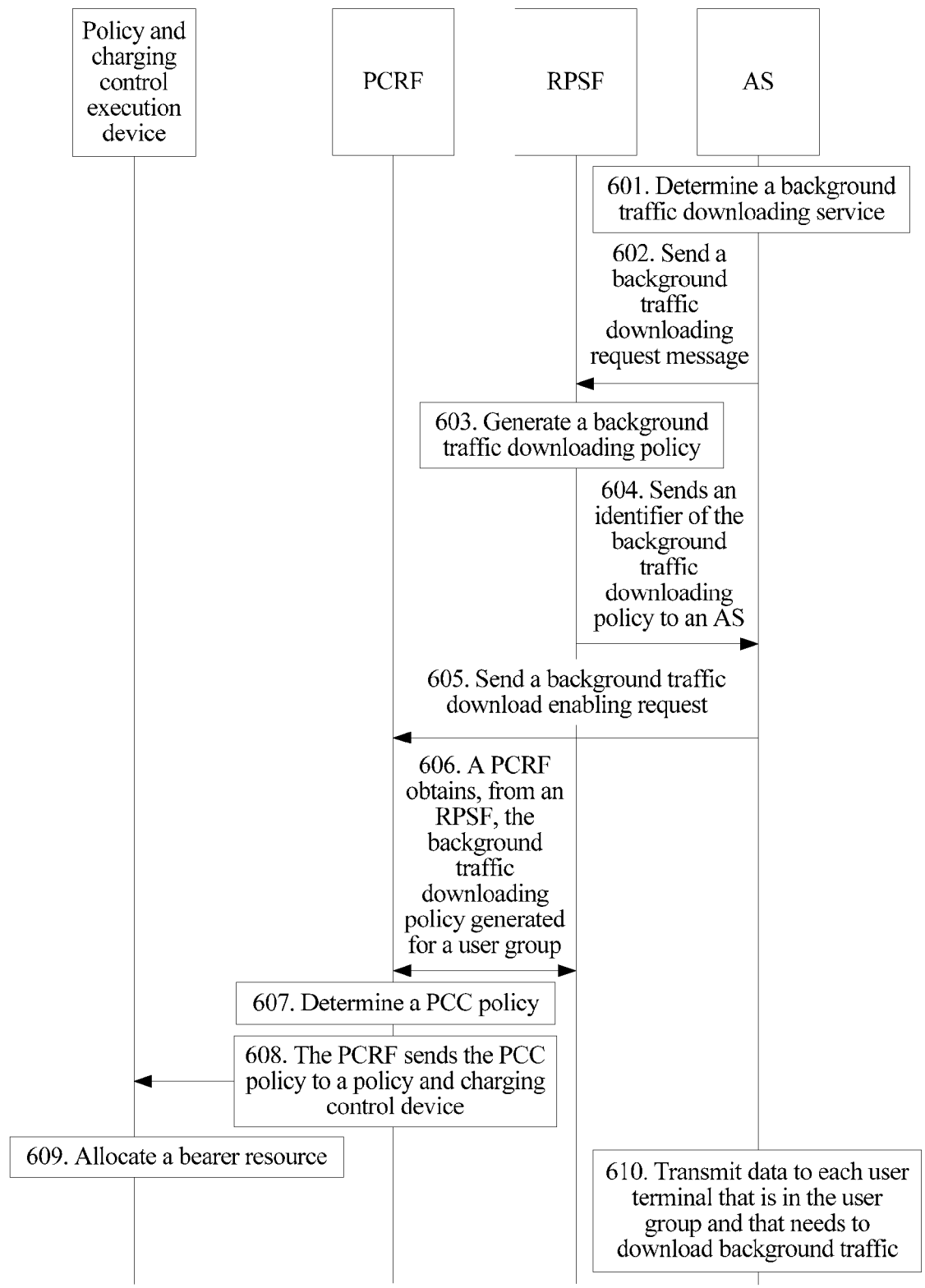
FIG. 6 is a schematic flowchart of a background traffic downloading method according to Embodiment 4 of the present invention.

This embodiment of the present invention provides a background traffic downloading method. The background traffic downloading method is applied to a background traffic management system. The background traffic management system includes an application server AS (a 3rd application service), a network capability exposure layer, an RPSF, and a PCRF. As shown in FIG. 6, the method includes the following steps.

601. The application server determines a background traffic downloading service.

Specifically, the application server determines requirement information required by a user group to download background traffic, and generates a background traffic downloading request message carrying the requirement information.

602. The application server sends a background traffic downloading request message to the RPSF by using the network capability exposure layer.

The application server and the RPSF may be corresponding to different protocols. However, the network capability exposure layer may have a protocol conversion function. Therefore, the application server needs to send the background traffic downloading request message to the RPSF by using the network capability exposure layer.

603. The RPSF generates a background traffic downloading policy.

In specific implementation, if the requirement information includes area information of the user group, the RPSF obtains, by using an Np interface, or the PCRF and an MME obtain, by using an Nq interface, network status information of an area corresponding to the area information of the user group.

In addition, the RPSF further generates an identifier of the background traffic downloading policy. In addition, the identifier may further include identifier information of the user group.

It should be noted that, when the requirement information includes a time window required by the user group to download background traffic, the RPSF needs to determine whether a network can satisfy, within the time window required by the user group to download background traffic, the background traffic downloading request sent by the application server. If the network satisfies, within the time window required by the user group to download background traffic, the background traffic downloading request sent by the application server, the RPSF generates the background traffic downloading policy for the user group. If the network does not satisfy, within the time window required by the user group to download background traffic, the background traffic downloading request sent by the application server, the RPSF sends, to the application server, a message indicating a policy generation failure.

604. The RPSF sends a policy identifier of the background traffic downloading policy to the application server.

605. The application server sends a background traffic download enabling request to the PCRF.

The background traffic download enabling request includes the identifier of the background traffic downloading policy and an IP address that is determined by the application server and that is of a user terminal that is in the user group and needs to download background traffic.

606. The PCRF obtains, from the RPSF, the background traffic downloading policy generated for a user group.

Specifically, the PCRF sends the policy identifier of the background traffic downloading policy to the RPSF, so that the RPSF determines, according to the identifier, the background traffic downloading policy that is generated for the user group and that is from multiple background traffic downloading policies formulated by the RPSF to download background traffic.

607. The PCRF determines a PCC policy.

The PCC policy herein is policy and charging control described in this embodiment of the present invention.

Specifically, the PCRF determines a dedicated-bearer establishment moment of a single user terminal and a maximum download rate of the single user, or determines a dedicated-bearer establishment moment of each user terminal and a maximum download rate of each user.

Both the dedicated-bearer establishment moment of the single user and the dedicated-bearer establishment time moment of each user terminal are moments in a permitted download time window included in the background traffic downloading policy.

608. The PCRF sends the PCC policy to a policy and charging control device.

609. The policy and charging control device allocates a bearer resource.

A policy and charging enforcement function device allocates, according to the policy and charging control, a bearer resource for background traffic downloading, or may allocate a bearer resource to each user terminal that is in the user group and that needs to download background traffic.

610. The application server transmits data to each user terminal that is in the user group and that needs to download background traffic.

Specifically, the application server transmits data to a corresponding user terminal according to a predetermined IP address of each user terminal that is in the user group and that needs to download background traffic.

In addition, if the background traffic downloading policy includes the permitted download time window, a maximum value of an aggregate download rate of the user group, a charging policy when the aggregate download rate is less than or equal to the maximum value, and a charging policy when the aggregate download rate is greater than the maximum value, after step 610, the method further includes: A policy and charging control execution device obtains a current aggregate download rate of the application server and performs accurate charging.

For specific implementation, refer to the specific charging method described in Embodiment 3, and details are not described herein again.

According to the background traffic downloading method provided in this embodiment of the present invention, an application server determines requirement information of a group to download background traffic, and sends, to an RPSF, a background traffic downloading request carrying the requirement information of the group, to request a network side to set up a background traffic downloading service for the group. The RPSF receives the background traffic downloading request message sent by the application server, and generates a background traffic downloading policy for the group. In the prior art, an application server forwards a background traffic downloading request of each user terminal in a group to a PCRF, and the PCRF generates a background traffic downloading policy for each user terminal in the group. However, in the present invention, the RPSF formulates a background traffic downloading policy for a background traffic downloading service of a group, instead of generating a corresponding background traffic downloading policy for each user terminal in the group, so as to avoid that the network side repeatedly responds to same requests from the application server. In addition, the application server determines an IP address of a user terminal that is in the group and that needs to download background traffic, so that a PCRF generates policy and charging control for the user terminal that is in the user group and that needs to download background traffic. Then a policy and charging control execution device allocates a bearer resource to the user terminal that is in the user group and that needs to download background traffic, and the application server transmits data to the user terminal that needs to download the background traffic. Therefore, network congestion caused due to simultaneous data transmission to all user terminals in the group is avoided.

Embodiment 5

Figure 7:
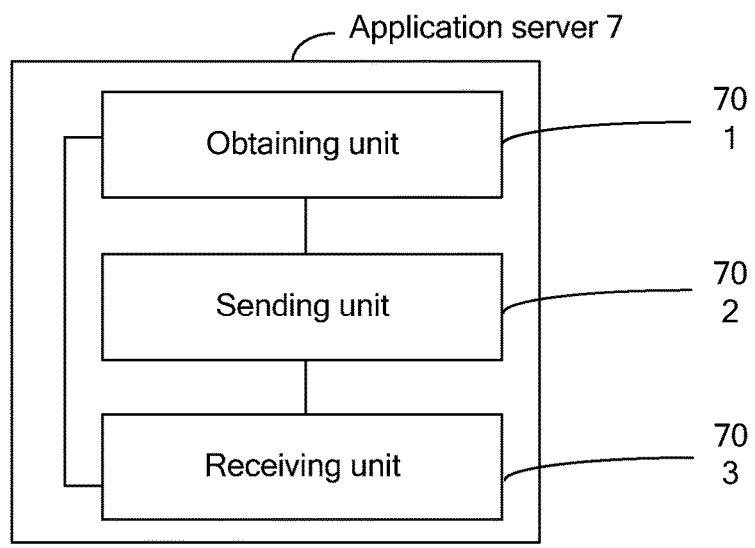
FIG. 7 is a schematic diagram of an application server according to Embodiment 5 of the present invention.

This embodiment of the present invention further provides an application server 7. As shown in FIG. 7, the application server 7 includes an obtaining unit 701, a sending unit 702, and a receiving unit 703.

The obtaining unit 701 is configured to obtain requirement information required by a user group to download background traffic.

The requirement information includes at least one of the following information: an amount of traffic required by the user group to download background traffic, a time window required by the user group to download background traffic, or area information of the user group.

It should be noted that the user group is a group that is in a group corresponding to the application server and that needs to download background traffic. Multiple users or all users in the user group receive background traffic from the application server. The background traffic may be system information of a group application, or periodic information subscribed by all users in a group, or any other type of information with same content. The amount of traffic required by the user group to download background traffic is an amount of traffic that is estimated by the obtaining unit 701 and that is required by the user group to download background traffic. The amount of traffic may be a total amount of traffic for background traffic downloading performed by user terminals in the user group, or may be a product of a unit amount of traffic for background traffic downloading performed by a single user terminal in the user group and a quantity of user terminals in the user group.

The area information of the user group refers to area information that is selected by the application server and that is of area coverage in which a background traffic downloading service is provided. The area coverage is corresponding to one or more of a tracking area, an evolved NodeB eNB, a cell, a routing area, or a service area of an operator.

The sending unit 702 is configured to send a background traffic downloading request message to network awareness and schedule unit. The background traffic downloading request message carries the requirement information required by the user group to download background traffic, so that the network awareness and schedule unit generates, according to the requirement information, a background traffic downloading policy for the background traffic downloading performed by the user group and an identifier of the background traffic downloading policy.

A network awareness and schedule device may be an RPSF on an operator network, and is configured to: collect, analyze, and predict network status information of the operator network, and support the application server in managing and invoking a network resource of the operator network. An exposure platform (a network capability exposure layer) is connected to the application server and the RPSF, to implement communication between the application server and the operator network. The exposure platform may have a protocol conversion function and may convert an interface protocol from an operator domain and an interface protocol used by an external server (for example, the application server described in this embodiment of the present invention).

The receiving unit 703 is configured to receive the identifier that is of the background traffic downloading policy of the user group and that is sent by the network awareness and schedule device.

Herein, the receiving unit 703 receives the identifier sent by the network awareness and schedule device, This proves that the network awareness and schedule device determines that the network satisfies the background traffic downloading request (that is, a background traffic downloading request initiated by the application server for the user group) from the application server, and that the network awareness and schedule device formulates the background traffic downloading policy for the user group. If the receiving unit 703 does not receive the policy identifier sent by the network awareness and schedule device, the receiving unit 703 receives a message that is sent by the network awareness and schedule device and that indicates a policy generation failure. This proves that the network awareness and schedule device determines that the network cannot satisfy the background traffic downloading request (a background traffic downloading request initiated by the application server for the user group) from the application server.

In addition, the identifier of the background traffic downloading policy may further carry identifier information of the user group, so that after a background traffic downloading policy is determined according to the identifier, it may be determined that the background traffic downloading policy is the background traffic downloading policy generated by the user group.

The sending unit 702 is further configured to send a background traffic download enabling request to a policy and charging rules function device. The background traffic download enabling request carries the identifier of the background traffic downloading policy, so that the policy and charging rules function device obtains the background traffic downloading policy of the user group according to the background traffic download enabling request, and determines policy and charging control in background traffic downloading.

The policy and charging rules function device may be a PCRF on the operator network, is connected to an RPSF by using an Np interface, and implements a policy and charging rules function.

Herein, first, the sending unit 702 needs to send the background traffic download enabling request to the PCRF. Then, the PCRF requests, from the RPSF, the background traffic downloading policy corresponding to the policy identifier included in the background traffic download enabling request sent by the sending unit 702 (that is, the background traffic downloading policy generated by the RPSF for the user group). Finally, the PCRF formulates the policy and charging control in the background traffic downloading for a user terminal in the user group, so as to transmit data to each user terminal in the user group.

The obtaining unit 701 is further configured to: after the receiving unit 703 receives the identifier that is of the background traffic downloading policy of the user group and that is sent by the network awareness and schedule device, obtain an IP address of each user terminal that is in the user group and that needs to download background traffic.

The background traffic download enabling request further includes the IP address of each user terminal that is in the user group and that needs to download background traffic, so that the PCRF determines the policy and charging control in the background traffic downloading for each user terminal that is in the user group and that needs to download background traffic.

The obtaining unit 701 is specifically configured to: obtain a total amount of traffic for background traffic downloading performed by all user terminals in the user group, and use the total amount of traffic as the amount of traffic required by the user group to download background traffic.

The obtaining unit 701 is specifically configured to: obtain a quantity of user terminals in the user group and a unit amount of traffic for background traffic downloading performed by a single user terminal in the user group, and determine, according to the unit amount of traffic and the quantity of user terminals in the user group, the amount of traffic required by the user group to download background traffic. The user terminals require a same amount of traffic to download background traffic.

The obtaining unit 701 is specifically configured to: obtain a time period required by the user group to download background traffic, and determine the time period as the time window required by the user group to download background traffic.

The obtaining unit 701 is specifically configured to: obtain a start moment of the background traffic downloading performed by the user group and timing information starting from the start moment, and determine, according to the start moment and the timing information starting from the start moment, the time window required by the user group to download background traffic.

The receiving unit 703 is configured to: receive a message that is sent by the network awareness and schedule unit and that indicates a policy generation failure, and receive timing information sent by the network awareness and schedule unit.

The sending unit 702 is further configured to send, after an interval of the timing information, the background traffic downloading request message to the network awareness and schedule unit by using the exposure platform.

The application server provided in this embodiment of the present invention obtains at least one of a time window required by a group to download background traffic, an amount of traffic required for downloading background traffic, or area information of the group, so that a network awareness and schedule device on an operator network formulates a background traffic downloading policy for the group to download background traffic, to avoid that the network awareness and schedule device repeatedly responds to same requests from the application server and formulates same background traffic downloading policies for multiple times. In addition, after it is determined that a network side satisfies a background traffic downloading request of the group, an IP address of a user terminal that is in the group and that needs to download background traffic is determined, so that a policy and charging rules function device on the operator network transmits data to the user terminal that needs to download background traffic. Therefore, network congestion caused due to simultaneous data transmission to all user terminals in the group can be avoided to some extent.

Figure 8:
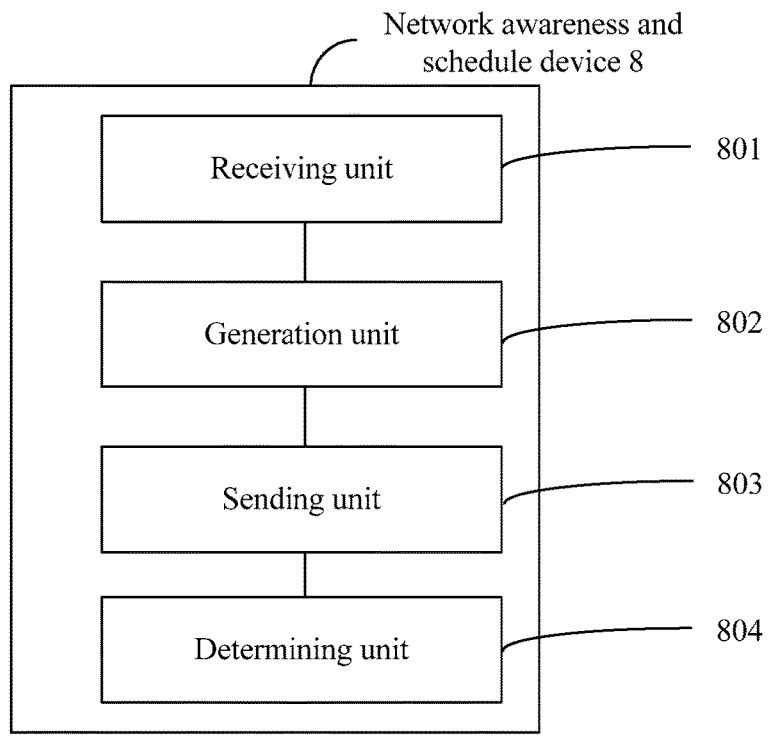
FIG. 8 is a schematic diagram of a network awareness and schedule device according to Embodiment 5 of the present invention.

This embodiment of the present invention further provides a network awareness and schedule device 8. As shown in FIG. 8, the network awareness and schedule device 8 includes a receiving unit 801, a generation unit 802, a sending unit 803, and a determining unit 804.

The receiving unit 801 is configured to receive a background traffic downloading request message sent by an application server. The background traffic downloading request message carries requirement information required by a user group to download background traffic.

The generation unit 802 is configured to generate a background traffic downloading policy of the user group and an identifier of the background traffic downloading policy according to the requirement information.

The identifier of the background traffic downloading policy may further include identifier information of the user group.

In addition, the network awareness and schedule device may be an RPSF on an operator network and may collect status information of the operator network, so as to determine whether an operator supports the background traffic downloading request (a background traffic downloading request initiated by the application server for the user group) from the application server, or formulate a corresponding background traffic downloading policy for the user group after determining that the operator supports the background traffic downloading request of the user group.

Herein, regardless of which item among an amount of traffic required by the user group to download background traffic, a time window required by the user group to download background traffic, and area information of the user group is included in the background traffic downloading request message sent by the application server, the generation unit 802 may formulate a background traffic downloading policy for the user group. The generation unit 802 formulates a background traffic downloading policy for the group, instead of generating a background traffic downloading policy for each user terminal, so as to avoid that a policy unit (the network awareness and schedule device) of the operator repeatedly responds to requests of a same type from the application server. In addition, when the user group requests to enable a background traffic service, the network awareness and schedule device 8 can determine, according to only the identifier that is of the background traffic downloading policy and that is included in a background traffic download enabling request of the user group, the background traffic downloading policy previously generated for the user group.

The application server may be corresponding to multiple groups. Therefore, after generating a corresponding background traffic downloading policy for each group, the generation unit 802 generates a unique corresponding identifier for each background traffic downloading policy, so that a background traffic downloading policy can be rapidly determined according to the identifier. For example, in this embodiment of the present invention, the network awareness and schedule device 8 can determine a unique background traffic downloading policy according to the identifier that is of the background traffic downloading policy and that is provided by a policy and charging rules function unit. Further, because the identifier includes the identifier information of the user group, it may be determined that the background traffic downloading policy is the background traffic downloading policy generated by the network awareness and schedule device for the user group.

The sending unit 803 is configured to send the identifier of the background traffic downloading policy to the application server.

Specifically, the sending unit 803 sends the identifier of the background traffic downloading policy to the application server by using an exposure platform.

The receiving unit 801 is further configured to receive the identifier that is of the background traffic downloading policy and that is sent by a policy and charging rules function device.

The determining unit 804 determines the background traffic downloading policy of the user group according to the identifier of the background traffic downloading policy.

The sending unit 803 is configured to send the background traffic downloading policy to the policy and charging rules function device, so that the policy and charging rules function device determines policy and charging control in background traffic downloading according to the background traffic downloading policy.

The generation unit 802 is specifically configured to: if the requirement information includes the amount of traffic required by the user group to download background traffic, determine a maximum value of an aggregate download rate of the user group according to the amount of traffic required by the user group to download background traffic, or determine a maximum download rate of a single user terminal according to a unit amount of traffic that is of the single user and that is corresponding to the amount of traffic required by the user group to download background traffic.

If the requirement information includes the time window required by the user group to download background traffic, a permitted download time window is included in the time window required by the user group to download background traffic, or the time window required by the user group to download background traffic includes a permitted download time window.

The network awareness and schedule device 8 further includes the determining unit 804.

The determining unit 804 is configured to: before the generation unit 802 generates the background traffic downloading policy of the user group and the identifier of the background traffic downloading policy according to the requirement information, and when the requirement information includes the time window required by the user group to download background traffic, determine that the network can satisfy, within the time window required by the user group to download background traffic, the background traffic downloading request from the application server.

The generation unit 802 is further configured to: after the determining unit 804 determines that the network cannot satisfy, within the time window required by the user group to download background traffic, the background traffic downloading request from the application server, generate a message indicating a policy generation failure.

The sending unit 803 is configured to send, to the application server, the message indicating the policy generation failure.

The sending unit 803 is configured to send timing information to the application server after the message indicating the policy generation failure is sent to the application server, so that the application server sends, after an interval of the timing information, the background traffic downloading request message to the network awareness and schedule device 8 by using the exposure platform.

After receiving a background traffic downloading request message that is requested by an application server to be sent for a user group, the network awareness and schedule device provided in this embodiment of the present invention determines, according to a network status and requirement information that is of the user group to download background traffic and that is included in the background traffic downloading request message, whether a network can satisfy the background traffic downloading request from the application server. After it is determined that the network can satisfy the background traffic downloading request of the user group, a generation unit 802 generates a background traffic downloading policy for the user group, and generates an identifier of the background traffic downloading policy, so that a background traffic downloading policy is determined according to the identifier sent by the application server. In addition, it may be determined, according to identifier information that is of the user group and that is included in the identifier, that the background traffic downloading policy is the background traffic downloading policy generated for a background traffic downloading service of the user group.

Figure 9:
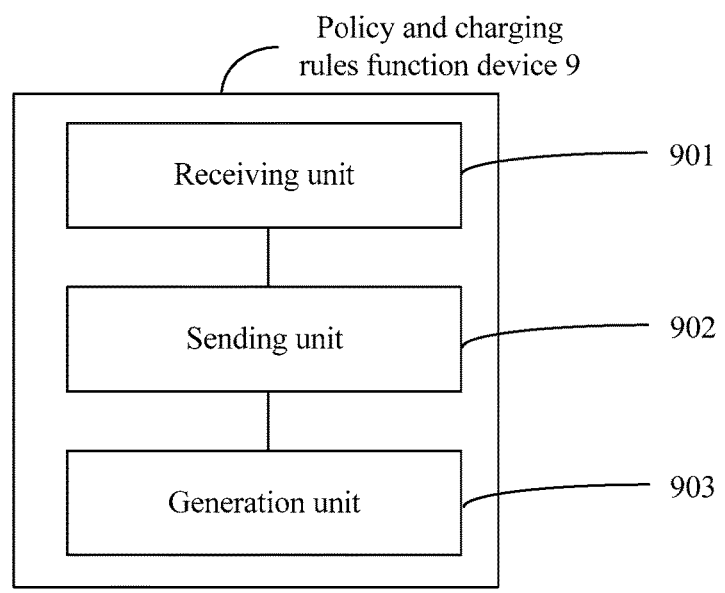
FIG. 9 is a schematic diagram of a policy and charging rules function device according to Embodiment 5 of the present invention.

This embodiment of the present invention further provides a policy and charging rules function device 9. As shown in FIG. 9, the policy and charging rules function device 9 includes a receiving unit 901, a sending unit 902, and a generation unit 903.

The receiving unit 901 is configured to receive a background traffic download enabling request sent by an application server. The background traffic download enabling request carries an identifier of a background traffic downloading policy of a user group.

The sending unit 902 is configured to send the identifier of the background traffic downloading policy to a network awareness and schedule device.

The receiving unit 901 is further configured to receive the background traffic downloading policy that is of the user group and that is returned by the network awareness and schedule device.

The generation unit 903 is configured to determine policy and charging control in background traffic downloading according to the background traffic downloading policy.

The generation unit 903 is specifically configured to: when the background traffic download enabling request further includes an IP address of each user terminal that is in the user group and that needs to download background traffic, determine, according to the background traffic downloading policy and the IP address of each user terminal that is in the user group and that needs to download background traffic, a dedicated-bearer establishment moment and a maximum download rate for each user terminal that is in the user group and that needs to download background traffic.

The sending unit 902 is configured to send the policy and charging control to a policy and charging enforcement function device, so that the policy and charging enforcement function device allocates, according to the policy and charging control, a bearer resource for the background traffic downloading. Finally, the application server transmits data to the user terminal in the user group.

Different from the prior art, the receiving unit 901 receives the IP address of each user terminal that is in the user group and that needs to download background traffic, the generation unit 903 determines a dedicated-bearer establishment moment and a maximum download rate for each user terminal that is in the user group and that needs to download the background traffic, and the policy and charging enforcement function device allocates a bearer resource to each user terminal that is in the user group and that needs to download background traffic. Finally, the application server transmits data to each user terminal that is in the user group and that needs to download background traffic. Therefore, network congestion caused due to simultaneous data transmission to all user terminals is avoided.

It should be noted that the user terminals do not have a same bearer establishment, and the user terminals do not have a same maximum download rate. The bearer establishment moments of the user terminals are moments in a permitted download time window included in the background traffic downloading policy.

The policy and charging rules function device provided in this embodiment of the present invention receives a background traffic download enabling request sent by an application server, requests a corresponding background traffic downloading policy from a network awareness and schedule device according to an identifier included in the background traffic download enabling request, and determines, according to identifier information that is of a user group and that is included in the identifier of the background traffic downloading policy, that the background traffic downloading policy fed back by the network awareness and schedule device is the background traffic downloading policy generated by the network awareness and schedule device for the user group. Finally, the policy and charging rules function device generates, according to an IP address that is included in the background traffic download enabling request and that is of a user terminal that is in the user group and that needs to download background traffic, policy and charging control for each user terminal that is in the user group and that needs to download background traffic, and data can be transmitted to the user terminal that needs to download background traffic. Therefore, network congestion caused due to simultaneous data transmission to all user terminals in the user group is avoided.

Embodiment 6

This embodiment of the present invention further provides a background traffic management system, including the foregoing application server 7, the foregoing network awareness and schedule device 8, and the foregoing policy and charging rules function device 9.

The application server 7 determines requirement information of a group to download background traffic, and sends a background traffic downloading request including the requirement information of the group to the network awareness and schedule device 8, to request a network side to set up a background traffic downloading service for the group. The network awareness and schedule device 8 receives the background traffic downloading request message sent by the application server 7, and generates a background traffic downloading policy for the group. In the present invention, the network awareness and schedule device 8 formulates a background traffic downloading policy for the group, instead of generating a background traffic downloading policy for each user terminal in the group, that is, to avoid that the network awareness and schedule device 8 repeatedly responds to same requests from the application server 7, instead of formulating multiple background traffic downloading policies. In addition, the application server 7 determines an IP address of a user terminal that is in the group and that needs to download background traffic, so that the policy and charging rules function device generates policy and charging control for the user terminal that is in the user group and that needs to download the background traffic. Data may be transmitted to the user terminal that is in the user group and that needs to download background traffic. Therefore, network congestion caused because the network side simultaneously transmits data to all user terminals in the group is avoided.

A person skilled in the art can understand that, in the foregoing embodiments in FIG. 7 to FIG. 9, the sending unit configured to send a message may be implemented by using a transmitter, or implemented by using a transceiver; the receiving unit configured to receive a message may be implemented by using a receiver, or implemented by using a transceiver. In physical implementation, the transmitter or the transceiver may be implemented by using a physical entity, or implemented by using multiple physical entities. The receiver and the transceiver may be implemented by using a physical entity, or implemented by using multiple physical entities. This is not limited herein in the present invention. Other units such as the obtaining unit, the generation unit, and the determining unit may be implemented by using one or more processors, and this is not limited herein in the present invention.

Figure 10:
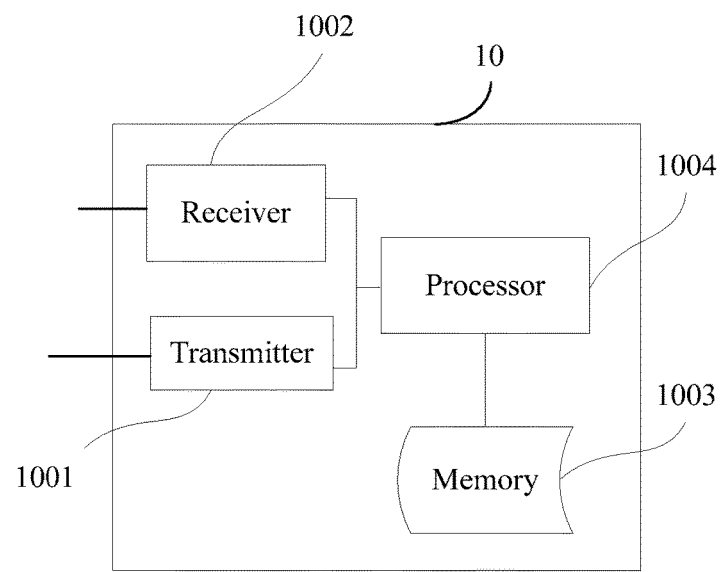
FIG. 10 is a schematic diagram of a background traffic downloading apparatus according to an embodiment of the present invention.

This embodiment of the present invention further provides a background traffic downloading apparatus 10. As shown in FIG. 10, the background traffic downloading apparatus 10 includes a transmitter 1001, a receiver 1002, a memory 1003, and a processor 1004 that is separately connected to the transmitter 1001, the receiver 1002, and the memory 1003. Certainly, the application server 10 may further include general-purpose components such as a baseband processing component, an intermediate radio frequency processing component, and an input/output apparatus, and this is not limited herein in this embodiment of the present invention. The memory 1003 stores a group of program code. The processor 1004 is configured to invoke the program code stored in the memory 1003 and is configured to perform the method processes of the background traffic downloading methods described in FIG. 2 to FIG. 4. When the method process of the background traffic downloading method described in FIG. 2 is performed, the background traffic downloading apparatus 10 may be a network awareness and schedule device. When the method process of the background traffic downloading method described in FIG. 3 is performed, the background traffic downloading apparatus 10 may be a policy and charging rules function device. When the method process of the background traffic downloading method described in FIG. 4 is performed, the background traffic downloading apparatus 10 may be an application server.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A background traffic downloading method, wherein the method comprises:
   receiving, by a network awareness and schedule device, a background traffic downloading request message sent by an application server, wherein the background traffic downloading request message carries requirement information for a user group to download background traffic;
   generating, by the network awareness and schedule device, a background traffic downloading policy of the user group and an identifier of the background traffic downloading policy according to the requirement information;
   sending, by the network awareness and schedule device, the identifier of the background traffic downloading policy to the application server; and
   receiving, by the network awareness and schedule device, the identifier of the background traffic downloading policy from a policy and charging rules function device, determining the background traffic downloading policy of the user group according to the identifier of the background traffic downloading policy, and sending the background traffic downloading policy to the policy and charging rules function device to facilitate the policy and charging rules function device determining policy and charging control in background traffic downloading according to the background traffic downloading policy.

2. The method according to claim 1, wherein the requirement information comprises at least one of the following information: an amount of traffic required by the user group to download background traffic, a time window required by the user group to download background traffic, or area information of the user group.

3. The method according to claim 1, wherein the background traffic downloading policy comprises at least one of the following information: a permitted download time window, charging information of a single user terminal, a maximum download rate of a single user terminal, a maximum value of an aggregate download rate of the user group, or a charging policy in cases of different aggregate download rates.

4. The method according to claim 3, wherein:
   if the requirement information comprises a time window required by the user group to download background traffic, the background traffic downloading policy comprises the permitted download time window, wherein the time window required by the user group to download background traffic comprises the permitted download time window; or
   if the requirement information comprises an amount of traffic required by the user group to download background traffic, the background traffic downloading policy comprises the maximum value of the aggregate download rate of the user group or the maximum download rate of a single user terminal in the user group, wherein the maximum value of the aggregate download rate of the user group or the maximum download rate of a single user terminal in the user group is determined according to the amount of traffic required by the user group to download background traffic.

5. The method according to claim 1, wherein if the requirement information comprises a time window required by the user group to download background traffic, the method further comprises:
   before generating the background traffic downloading policy of the user group and the identifier of the background traffic downloading policy, determining, by the network awareness and schedule device, that a network can satisfy, within the time window required by the user group to download background traffic, the background traffic downloading request from the application server.

6. A network awareness and schedule device, comprising:
   a receiver, configured to receive a background traffic downloading request message sent by an application server, wherein the background traffic downloading request message carries requirement information for a user group to download background traffic;
   a processor, configured to generate a background traffic downloading policy of the user group and an identifier of the background traffic downloading policy according to the requirement information; and
   a transmitter, configured to send the identifier of the background traffic downloading policy to the application server;
   wherein the receiver is further configured to receive the identifier of the background traffic downloading policy from a policy and charging rules function device;
   wherein the processor is further configured to determine the background traffic downloading policy of the user group according to the identifier of the background traffic downloading policy;
   wherein the transmitter is further configured to send the background traffic downloading policy to the policy and charging rules function device to facilitate the policy and charging rules function device determining policy and charging control in background traffic downloading according to the background traffic downloading policy.

7. The network awareness and schedule device according to claim 6, wherein the requirement information comprises at least one of the following information: an amount of traffic required by the user group to download background traffic, a time window required by the user group to download background traffic, or area information of the user group.

8. The network awareness and schedule device according to claim 6, wherein the background traffic downloading policy comprises at least one of the following information: a permitted download time window, charging information of a single user terminal, a maximum download rate of a single user terminal, a maximum value of an aggregate download rate of the user group, or a charging policy in cases of different aggregate download rates.

9. The network awareness and schedule device according to claim 8, wherein:
   if the requirement information comprises a time window required by the user group to download background traffic, the background traffic downloading policy comprises the permitted download time window, wherein the time window required by the user group to download background traffic comprises the permitted download time window; or if the requirement information comprises an amount of traffic required by the user group to download background traffic, the background traffic downloading policy comprises the maximum value of the aggregate download rate of the user group or the maximum download rate of a single user terminal in the user group, wherein the maximum value of the aggregate download rate of the user group or the maximum download rate of a single user terminal in the user group is determined according to the amount of traffic required by the user group to download background traffic.

10. The network awareness and schedule device according to claim 6, wherein the processor is further configured to, before generating the background traffic downloading policy of the user group and the identifier of the background traffic downloading policy, determine that a network can satisfy, within the time window required by the user group to download background traffic, the background traffic downloading request from the application server when the requirement information comprises a time window required by the user group to download background traffic.

11. A system, comprising:
a network awareness and schedule device;
a policy and charging rules function device; and
an application server;
wherein the network awareness and schedule device is configured to receive a background traffic downloading request message sent by the application server, wherein the background traffic downloading request message carries requirement information for a user group to download background traffic;
wherein the network awareness and schedule device is configured to generate a background traffic downloading policy of the user group and an identifier of the background traffic downloading policy according to the requirement information, and send the identifier of the background traffic downloading policy to the application server;
wherein the application server is configured to receive the identifier of the background traffic downloading policy and send a background traffic download enabling request to the policy and charging rules function device, wherein the background traffic download enabling request carries the identifier of the background traffic downloading policy;
wherein the policy and charging rules function device is configured to receive the background traffic download enabling request and send the identifier of the background traffic downloading policy to the network awareness and schedule device, and receive the background traffic downloading policy of the user group from the network awareness and schedule device;
wherein the policy and charging rules function device is configured to determine policy and charging control in background traffic downloading according to the background traffic downloading policy.

\* \* \* \* \*